US012272272B2

(12) United States Patent
Song et al.

(10) Patent No.: US 12,272,272 B2
(45) Date of Patent: Apr. 8, 2025

(54) ROLLABLE DISPLAY DEVICE HAVING AN ADHESIVE UNIT WITH REDUCED MODULUS

(71) Applicant: LG Display Co., Ltd., Seoul (KR)

(72) Inventors: JiHun Song, Seoul (KR); Hoiyong Kwon, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 140 days.

(21) Appl. No.: 17/541,033

(22) Filed: Dec. 2, 2021

(65) Prior Publication Data

US 2022/0172650 A1 Jun. 2, 2022

(30) Foreign Application Priority Data

Dec. 2, 2020 (KR) ........................ 10-2020-0166915

(51) Int. Cl.
*G06F 1/16* (2006.01)
*G09F 9/30* (2006.01)

(52) U.S. Cl.
CPC .................................... *G09F 9/301* (2013.01)

(58) Field of Classification Search
CPC ... G09F 9/301; G06F 1/1652; G02F 1/133308
See application file for complete search history.

(56) References Cited

U.S. PATENT DOCUMENTS 10,168,740 B2 * 1/2019 Choi ..................... G06F 3/0412
10,186,681 B2 * 1/2019 Kang ..................... H10K 50/86
10,263,216 B2 * 4/2019 Koo .................. G02F 1/133305
10,490,771 B2 * 11/2019 Kim ..................... H10K 50/844
10,754,190 B2 * 8/2020 Watanabe ......... G02F 1/133605
10,852,583 B2 * 12/2020 Watanabe ............ G02B 6/0055
11,079,625 B2 * 8/2021 Watanabe ......... G02F 1/133345
11,112,548 B2 * 9/2021 Cho ..................... G02B 5/3016
11,127,323 B2 * 9/2021 Kim ...................... G06F 1/1652
11,262,803 B2 * 3/2022 Pyo ....................... G06F 1/1652
11,627,671 B2 * 4/2023 Feng ................... H04M 1/0268 361/807
11,662,780 B2 * 5/2023 Park ...................... G06F 1/1616 361/679.01
11,737,315 B2 * 8/2023 Kang ................ H10K 59/8794 257/40
2012/0262660 A1 * 10/2012 Fujiwara ............... G02F 1/1333 349/158

(Continued)

FOREIGN PATENT DOCUMENTS

CN 110009996 A 7/2019
CN 110335546 A 10/2019

(Continued)

*Primary Examiner* — Rockshana D Chowdhury
*Assistant Examiner* — Douglas R Burtner
(74) *Attorney, Agent, or Firm* — Birch, Stewart, Kolasch & Birch, LLP

(57) ABSTRACT

A display device can include a display panel, a cover supporting a rear surface of the display panel and including a plurality of openings in the cover, a roller configured to wind and unwind the display panel and the cover, and an adhesive unit bonding the display panel with the cover. The adhesive unit includes a first adhesive member, a base layer disposed on the first adhesive member and having a plurality of patterns, and a second adhesive member disposed on the base layer.

5 Claims, 30 Drawing Sheets

(56) References Cited

U.S. PATENT DOCUMENTS

| | | | | |
|---|---|---|---|---|
| 2014/0346451 | A1* | 11/2014 | Oh | H10K 50/8428 428/116 |
| 2016/0104850 | A1* | 4/2016 | Joo | B32B 3/266 428/116 |
| 2016/0224068 | A1* | 8/2016 | Choi | G06F 3/045 |
| 2016/0255713 | A1* | 9/2016 | Kim | G09F 9/301 361/749 |
| 2017/0318688 | A1* | 11/2017 | Kim | H05K 5/0017 |
| 2018/0103551 | A1* | 4/2018 | Park | H05K 5/0217 |
| 2018/0321708 | A1* | 11/2018 | Wu | G06F 3/0443 |
| 2019/0165311 | A1* | 5/2019 | Lee | H10K 50/84 |
| 2021/0204428 | A1* | 7/2021 | Kim | G09F 9/301 |
| 2021/0233447 | A1* | 7/2021 | Park | G06F 1/1616 |
| 2021/0286407 | A1* | 9/2021 | Kim | G06F 1/1641 |
| 2022/0043187 | A1* | 2/2022 | Choi | G02B 1/14 |
| 2022/0322542 | A1* | 10/2022 | Wu | G06F 1/1637 |
| 2022/0346249 | A1* | 10/2022 | Ahn | G09F 9/301 |
| 2023/0376070 | A1* | 11/2023 | Ju | H04M 1/0268 |
| 2024/0180018 | A1* | 5/2024 | Cho | H10K 77/111 |

FOREIGN PATENT DOCUMENTS

| | | | |
|---|---|---|---|
| CN | 111161633 | A | 5/2020 |
| KR | 10-2017-0064161 | A | 6/2017 |
| KR | 10-1945985 | B1 | 1/2019 |
| KR | 10-2019-0028875 | A | 3/2019 |
| KR | 10-2019-0064183 | A | 6/2019 |
| KR | 10-2020-0052016 | A | 5/2020 |
| KR | 10-2020-0053234 | A | 5/2020 |

* cited by examiner

ROLLABLE DISPLAY DEVICE HAVING AN ADHESIVE UNIT WITH REDUCED MODULUS

CROSS-REFERENCE TO RELATED APPLICATIONS

This application claims priority to Korean Patent Application No. 10-2020-0166915 filed on Dec. 2, 2020, in the Korean Intellectual Property Office, the entire contents of which are incorporated by reference into the present application.

BACKGROUND

Field

The present disclosure relates to a display device, and more particularly, to a rollable display device which is capable of displaying images even in a rolled state or a partially rolled state.

Description of the Related Art

Among display devices, which are used for a monitor of a computer, a television, a cellular phone, or the like, there are an organic light emitting display (OLED) device which is a self-emitting device, a liquid crystal display (LCD) device which uses a separate light source, and the like.

An applicable range of the display device is diversified to personal digital assistants as well as monitors of computers and televisions and a display device with a large display area and a reduced volume and weight is being studied.

Recently, a rollable display device which is manufactured by forming a display element, a wiring line, and the like on a flexible substrate such as plastic which is a flexible material capable of displaying images even though the display device is rolled is getting attention as the next generation display device.

For example, a rollable display device can be used in various devices (e.g., smart phones, smart TVs, computer monitors, etc.) in which a flexible display panel can be rolled up in a stowed state while not in use, and unrolled in an extended state while in use. However, repeatedly rolling and unrolling such a rollable display device can cause significant wear and tear over time that may degrade image quality (e.g., due to the formation of cracks, or damaged or dead subpixels, materials from different layers mixing etc.).

SUMMARY OF THE DISCLOSURE

An object to be achieved by the present disclosure is to provide a display device which improves a stress decoupling effect of an adhesive unit by reducing a modulus of the adhesive unit.

Another object to be achieved by the present disclosure is to provide a display device in which a crack to be caused in the display device is reduced by reducing a stress which may be generated in the display device.

Still another object to be achieved by the present disclosure is to provide a display device in which a leakage of an adhesive member to an opening of the first cover is minimized.

Objects of the present disclosure are not limited to the above-mentioned objects, and other objects, which are not mentioned above, can be clearly understood by those skilled in the art from the following descriptions.

In order to achieve the above-described objects, according to an aspect of the present disclosure, a display device includes a display panel, a cover which supports a rear surface of the display panel and includes a plurality of openings; a roller configured to wind or unwind the display panel and the cover; and an adhesive unit which bonds the display panel and the cover and the adhesive unit includes a first adhesive member; a base layer which is disposed on the first adhesive member and has a plurality of patterns; and a second adhesive member on the first adhesive member and the base layer.

In order to achieve the above-described objects, according to another aspect of the present disclosure, a display device includes a display panel, a cover which is attached onto a rear surface of the display panel and includes a plurality of openings; a roller configured to be connected to the cover to wind or unwind the display panel; and an adhesive unit which attaches the display panel to the cover, and the adhesive unit includes a base layer; a first adhesive member disposed between the base layer and the display panel; and a second adhesive member disposed between the base layer and the cover.

Other detailed matters of the example embodiments are included in the detailed description and the drawings.

According to the present disclosure, a modulus of the adhesive unit is reduced by a pattern shape of the adhesive unit to reduce a stress generated in the display device due to the usage of the adhesive unit.

According to the present disclosure, a crack caused due to the long-time usage of the display device can be reduced.

According to the present disclosure, the residual adhesive leakage phenomenon of the adhesive member through the opening of the first cover can be improved.

The effects according to the present disclosure are not limited to the contents exemplified above, and more various effects are included in the present disclosure.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENTS

Figure 1A:
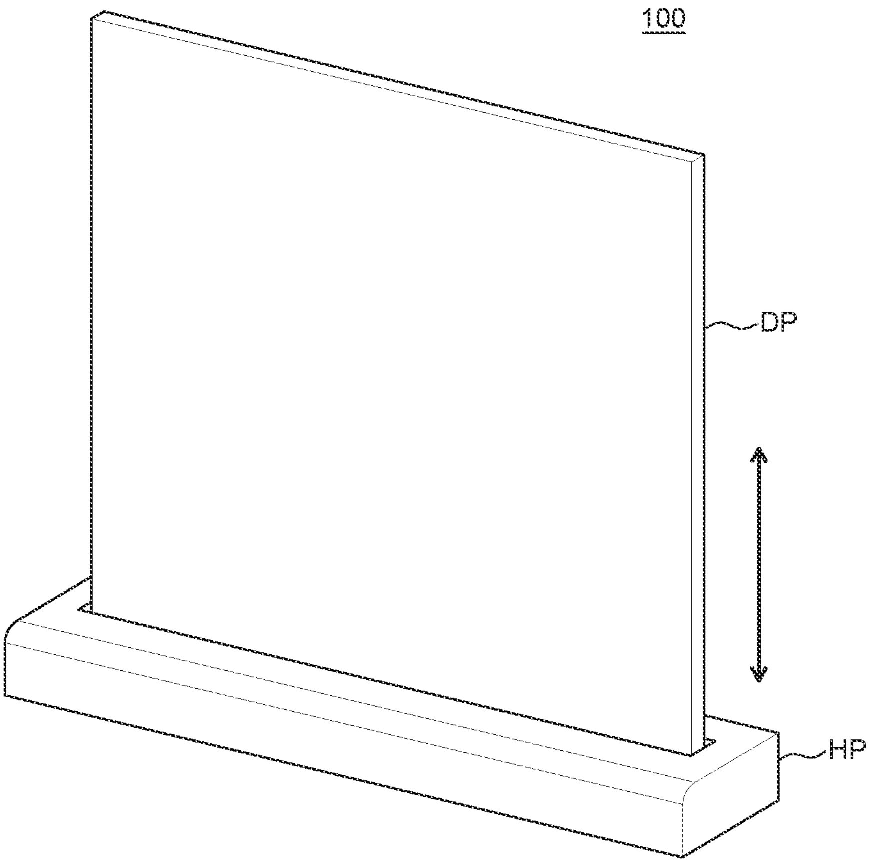
FIGS. 1A and 1B are perspective views of a display device according to an example embodiment of the present disclosure.

Advantages and characteristics of the present disclosure and a method of achieving the advantages and characteristics will be clear by referring to example embodiments described below in detail together with the accompanying drawings. However, the present disclosure is not limited to the example embodiments disclosed herein but will be implemented in various forms. The example embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the example embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as “including,” “having,” and “consist of” used herein are generally intended to allow other components to be added unless the terms are used with the term “only.” Any references to singular may include plural unless expressly stated otherwise.

Components are interpreted to include an ordinary error range even if not expressly stated.

When the position relation between two parts is described using the terms such as “over,” “on,” “above,” “below,” and “next,” one or more parts may be positioned between the two parts unless the terms are used with the term “immediately” or “directly.”

When an element or layer is disposed “on” the other element or layer, another layer or another element can be interposed directly on the other element or therebetween.

Although the terms “first,” “second,” and the like are used for describing various components, these components are not confined by these terms. These terms are merely used for distinguishing one component from the other components, and may not define order. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely bonded to or combined with each other and can be interlocked and operated in technically various ways, and the embodiments can be carried out independently of or in association with each other.

Hereinafter, various example embodiments of the present disclosure will be described in detail with reference to accompanying drawings. All the components of each rollable display device according to all embodiments of the present disclosure are operatively coupled and configured.

Display Device-Rollable Display Device

A rollable display device can be referred to as a display device which is capable of displaying images even though the display device is rolled. The rollable display device can have a high flexibility as compared with a general display device of the related art. Depending on a use of a rollable display device, a shape of the rollable display device can freely vary. Specifically, when the rollable display device is not used, the rollable display device is rolled to be stored with a reduced volume. In contrast, when the rollable display device is used, the rolled rollable display device is unrolled to be used.

Figure 1B:
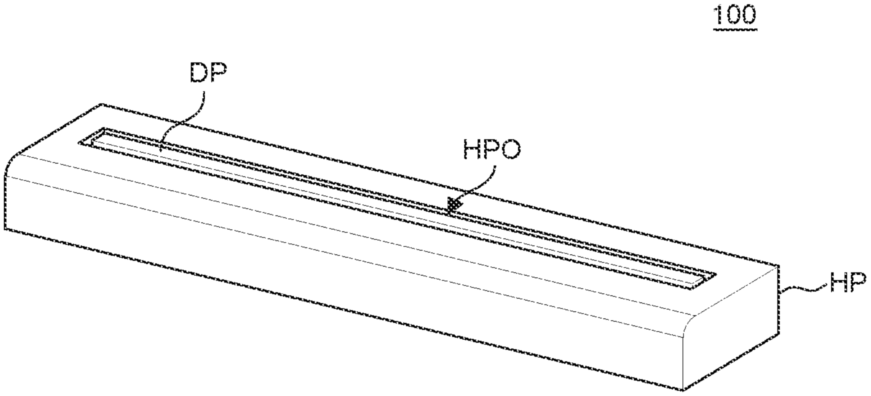

FIGS. 1A and 1B are perspective views of a display device according to an example embodiment of the present disclosure. Referring to FIGS. 1A and 1B, a display device according to an embodiment of the present disclosure includes a display unit DP and a housing unit HP.

The display unit DP is a configuration for displaying images to a user and for example, in the display unit DP, a display element and a circuit, a wiring line, a component, and the like for driving the display element can be disposed. In this situation, since the display device 100 according to an embodiment of the present disclosure is a rollable display device 100, the display unit DP can be configured to be wound and unwound. For example, the display unit DP can be formed of a display panel 120 and a first cover 110*a* each having a flexibility to be wound or unwound. The display unit DP will be described below in more detail with reference to FIGS. 4A to 6C.

The housing unit HP is a case in which the display unit DP is accommodated. The display unit DP can be wound to be accommodated inside of the housing unit HP and the display unit DP can be unwound to be disposed outside of the housing unit HP.

The housing unit HP has an opening HPO to allow the display unit DP to move in and out of the housing unit HP. The display unit DP can move in a vertical direction by passing through the opening HPO of the housing unit HP.

In addition, the display unit DP of the display device 100 can be switched from a fully unwound state to a fully wound state or from a fully wound state to a fully unwound state. Also, the display unit DP of the display device 100 can be set in a partially wound state or partially unwound state.

FIG. 1A illustrates a fully unwound state of the display unit DP of the display device 100 and the fully unwound display unit DP of the display device 100 is disposed outside of the housing unit HP. That is, in order for a user to watch images through the display device 100, when the display unit DP is unwound to be positioned outside of the housing unit HP as much as possible and cannot be further unwound, it can be defined as a fully unwound state.

FIG. 1B illustrates the display unit DP of the display device 100 which is fully wound and in the fully wound state, the display unit DP of the display device 100 is accommodated within the housing unit HP and cannot be further wound. That is, when the user does not watch the images through the display device 100, it is advantageous from the viewpoint of an outer appearance that the display unit DP is not positioned outside of the housing unit HP. Therefore, when the display unit DP is wound to be accommodated in the housing unit HP, it is defined as a fully wound state. Further, when the display unit DP is in a fully wound state to be accommodated in the housing unit HP, a volume of the display device 100 is reduced so that the display device 100 can be easily carried or made portable.

In addition, in order to switch the display unit DP to a fully unwound state or a fully wound state, a driving unit MP which winds or unwinds the display unit DP is disposed within the housing unit HP.

Driving Unit

Figure 2:
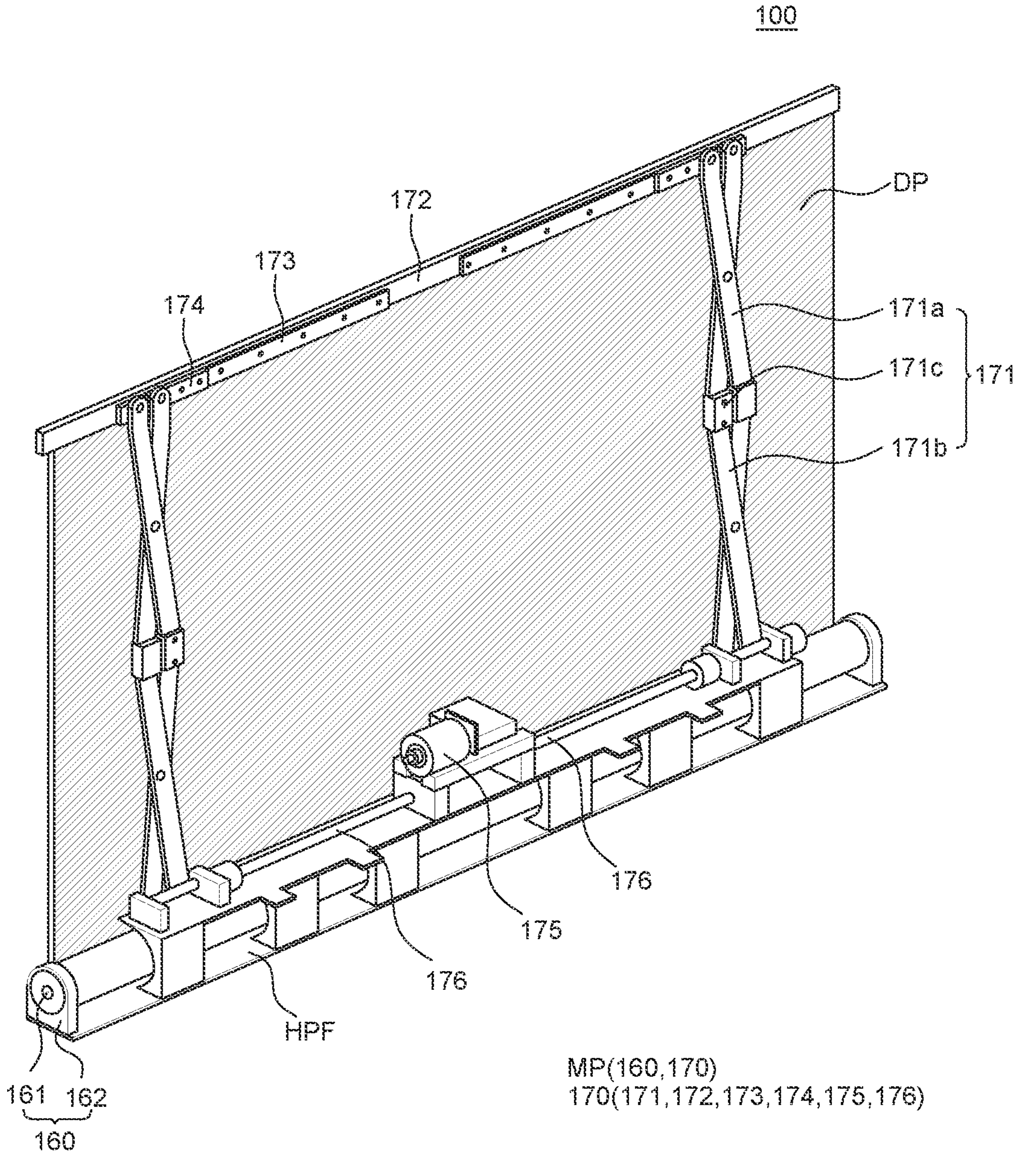
FIG. 2 is a perspective view of a display device according to an example embodiment of the present disclosure.
Figure 3:
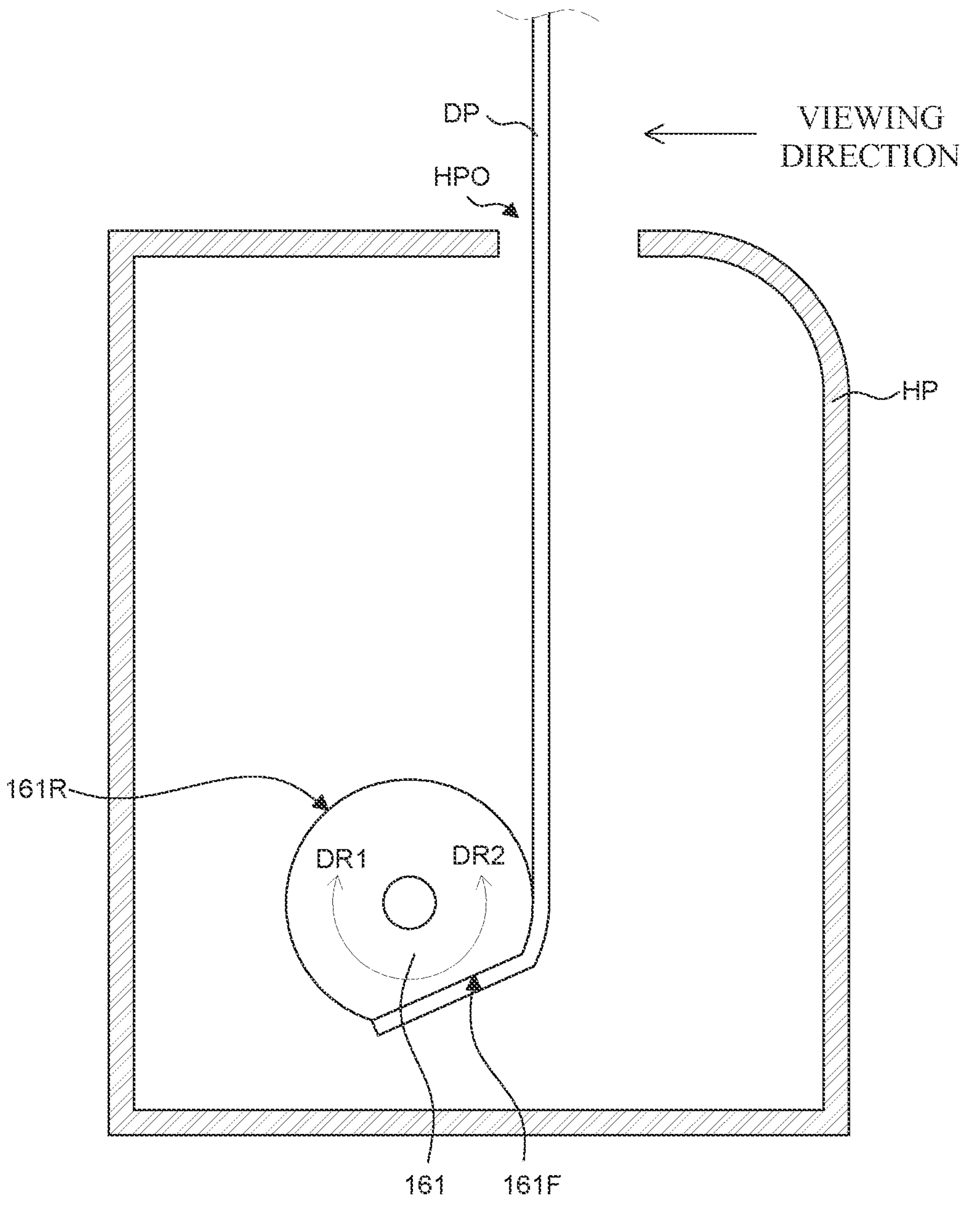
FIG. 3 is a schematic cross-sectional view of a display device according to an example embodiment of the present disclosure.

FIG. 2 is a perspective view of a display device according to an example embodiment of the present disclosure. FIG. 3 is a schematic cross-sectional view of a display device according to an example embodiment of the present disclosure. FIG. 3 is a schematic cross-sectional view for explaining a roller 161 and a display unit DP of a display device 100 according to an example embodiment of the present disclosure. For the convenience of description, in FIG. 3, only a housing unit HP, a roller 161, and a display unit DP are illustrated.

First, referring to FIG. 2, a driving unit MP includes a roller unit 160 and a lifting unit 170.

The roller unit 160 rotates in a clockwise direction or a counterclockwise direction to wind or unwind the display unit DP fixed to the roller unit 160. The roller unit 160 includes a roller 161 and a roller support unit 162.

The roller 161 is a member around which the display unit DP is wound. The roller 161 can be, for example, formed to have a cylindrical shape. A lower edge of the display unit DP can be fixed to the roller 161. When the roller 161 rotates, the display unit DP which is fixed to the roller 161 through the lower edge can be wound around the roller 161. In contrast, when the roller 161 rotates in an opposite direction, the display unit DP which is wound around the roller 161 can be unwound from the roller 161.

Referring to FIG. 3, the roller 161 can be formed to have a cylindrical shape in which at least a part of an outer circumferential surface of the roller 161 is flat and the remaining part of the outer circumferential surface is a curved portion. Even though the roller 161 can have entirely a cylindrical shape, but a part thereof can be formed of a flat surface. That is, a part of the outer circumferential surface of the roller 161 is formed to be flat and the remaining part of the outer circumferential surface is formed to be a curved surface. For example, the roller 161 is configured by a curved portion 161R and a flat portion 161F, and the plurality of flexible films and the printed circuit board of the display unit DP are seated in the flat portion 161F of the roller 161. However, the roller 161 can have a completely cylindrical shape or an arbitrary shape which can wind the display unit DP, but is not limited thereto.

Referring to FIG. 2 again, the roller support unit 162 supports the roller 161 at both sides of the roller 161. Specifically, the roller support unit 162 is disposed on a bottom surface HPF of the housing unit HP. Upper side surfaces of the roller support unit 162 are coupled to both ends of the roller 161. By doing this, the roller support unit 162 can support the roller 161 to be spaced apart from the bottom surface HPF of the housing unit HP. In this situation, the roller 161 can be rotatably coupled to the roller support unit 162.

The lifting unit 170 moves the display unit DP in a vertical direction in accordance with the driving of the roller unit 160. The lifting unit 170 includes a link unit 171, a head bar 172, a slide rail 173, a slider 174, a motor 175, and a rotary unit 176.

The link unit 171 of the lifting unit 170 includes a plurality of links 171*a* and 171*b* and a hinge unit 171*c* which connects the plurality of links 171*a* and 171*b* coupled to each other. Specifically, the plurality of links 171*a* and 171*b* includes a first link 171*a* and a second link 171*b*, and the first link 171*a* and the second link 171*b* cross each other in the form of scissors to be rotatably fastened by means of the hinge unit 171*c*. When the link unit 171 moves in the vertical direction, the plurality of links 171*a* and 171*b* rotate to be far away from each other or close to each other (e.g., two pantographs can be disposed near opposite sides at the rear of the display, each having scissoring linkage mechanisms).

The head bar 172 of the lifting unit 170 is fixed to an uppermost end of the display unit DP. The head bar 172 is coupled to the link unit 171 to move the display unit DP in the vertical direction in accordance with the rotation of the plurality of links 171*a* and 171*b* of the link unit 171. That is, the display unit DP can move in a vertical direction by the head bar 172 and the link unit 171.

The head bar 172 covers only a part of a surface which is adjacent to an uppermost edge of the display unit DP so as not to hide an image displayed on the front surface of the display unit DP. The display unit DP and the head bar 172 can be fixed by a screw, but are not limited thereto.

The slide rail 173 of the lifting unit 170 provides a movement path of the plurality of links 171*a* and 171*b*. Parts of the plurality of links 171*a* and 171*b* are rotatably fastened with the slide rail 173 so that the motion can be guided along a trajectory of the slide rail 173. Parts of the plurality of links 171*a* and 171*b* are fastened with the slider 174 which is movably provided along the slide rail 173 to move along a trajectory of the slide rail 173.

The motor 175 is connected to a power generating unit, such as a separate external power source or a built-in battery, to be supplied with the power. The motor 175 generates a torque to provide a driving force to the rotary unit 176.

The rotary unit 176 is connected to the motor 175 to be configured to convert a rotational motion from the motor 175 into a linear reciprocating motion. That is, the rotational motion of the motor 175 can be converted into the linear reciprocating motion of a structure fixed to the rotary unit 176. For example, the rotary unit 176 can be implemented by a ball screw including a shaft and a nut which is fastened with the shaft, but is not limited thereto.

The motor 175 and the rotary unit 176 interwork with the link unit 171 to lift and lower the display unit DP. The link unit 171 is formed with a link structure to receive the driving force from the motor 175 and the rotary unit 176 to be repeatedly folded or unfolded.

Specifically, when the display unit DP is wound, the motor 175 is driven so that the structure of the rotary unit 176 can perform a linear motion. That is, a part of the rotary unit 176 to which one end of the second link 171*b* is coupled can perform the linear motion. Therefore, one end of the second link 171*b* can move to the motor 175 and the plurality of links 171*a* and 171*b* are folded so that the height of the link unit 171 can be lowered. Further, while the plurality of links 171*a* and 171*b* are folded, the head bar 172 coupled to the first link 171*a* is also lowered and one end of the display unit DP coupled to the head bar 172 is also lowered.

When the display unit DP is unwound, the motor 175 is driven so that the structure of the rotary unit 176 can perform a linear motion. That is, a part of the rotary unit 176 to which one end of the second link 171*b* is coupled can perform the linear motion. Therefore, one end of the second link 171*b* can move to be far away from the motor 175 and the plurality of links 171*a* and 171*b* is unfolded so that the height of the link unit 171 can be increased. Further, while the plurality of links 171*a* and 171*b* is unfolded, the head bar 172 coupled to the first link 171*a* is also lifted and the display unit DP coupled to the head bar 172 is also lifted.

Accordingly, when the display unit DP is fully wound around the roller 161, the link unit 171 of the lifting unit 170 maintains a folded state. That is, when the display unit DP is fully wound around the roller 161, the lifting unit 170 can have a smallest height. In contrast, when the display unit DP is fully unwound, the link unit 171 of the lifting unit 170 maintains a stretched state. That is, when the display unit DP is fully unwound, the lifting unit 170 can have a highest height.

In addition, when the display unit DP is wound, the roller 161 can rotate and the display unit DP can be wound around the roller 161. Referring to FIG. 3, a lower edge of the display unit DP is coupled to the roller 161. When the roller 161 rotates in a first direction DR1, that is, a clockwise direction, the display unit DP can be wound while a rear surface of the display unit DP is in close contact with a surface of the roller 161.

When the display unit DP is unwound, the roller 161 can rotate and the display unit DP can be unwound from the roller 161. For example, referring to FIG. 3, when the roller 161 rotates in a second direction DR2, that is, in a counter-clockwise direction, the display unit DP which is wound around the roller 161 is unwound from the roller 161 to be disposed outside of the housing unit HP.

In some example embodiments, a driving unit MP having another structure other than the above-described driving unit MP can be applied to the display device 100. That is, as long as the display unit DP is wound and unwound, the above-described configuration of the roller unit 160 and the lifting unit 170 can be modified, some configurations can be omitted, or another configuration can be added.

Display Unit

Figure 4A:
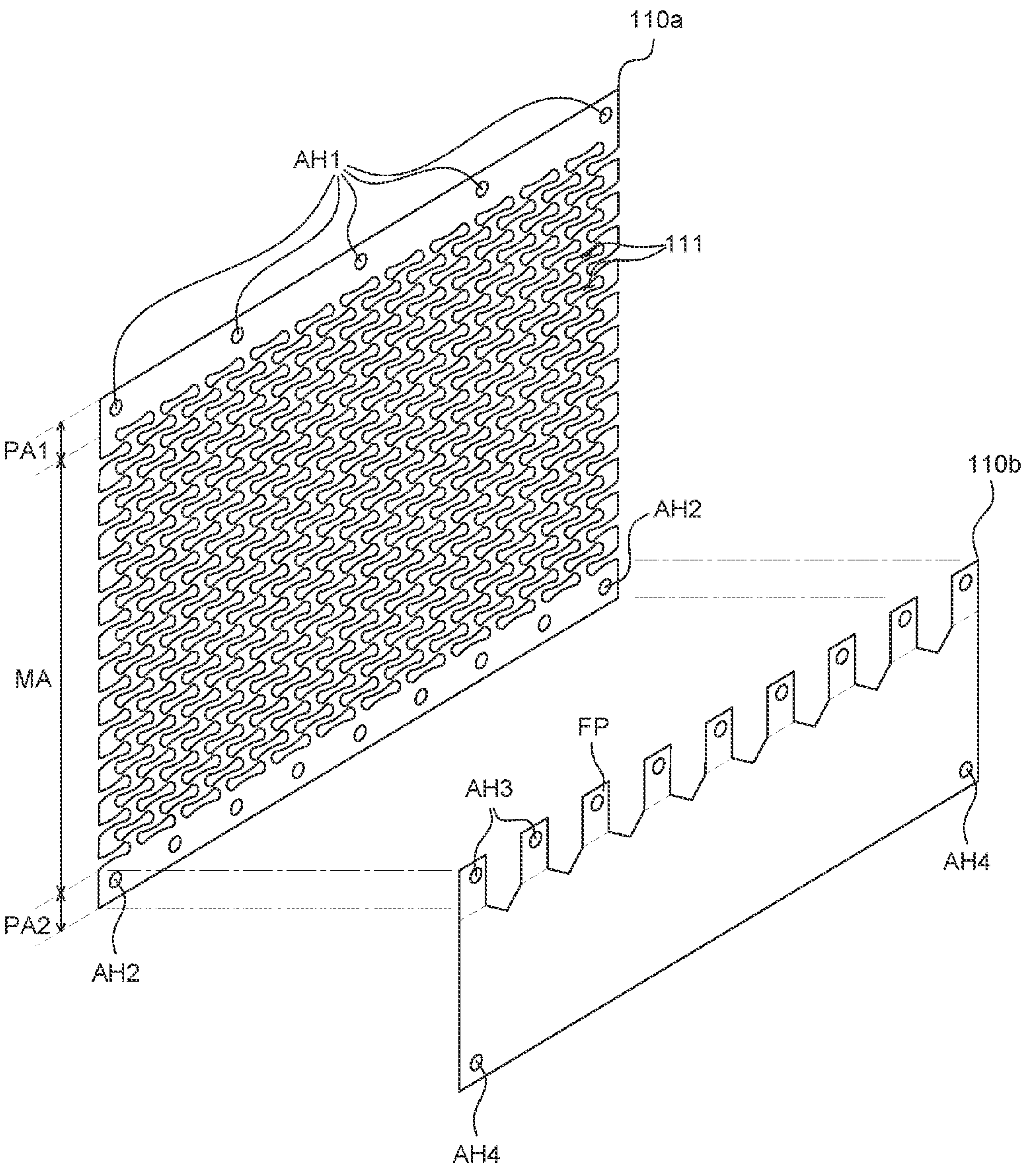
FIG. 4A is an exploded perspective view for explaining a first cover and a second cover of a display device according to an example embodiment of the present disclosure.
Figure 4B:
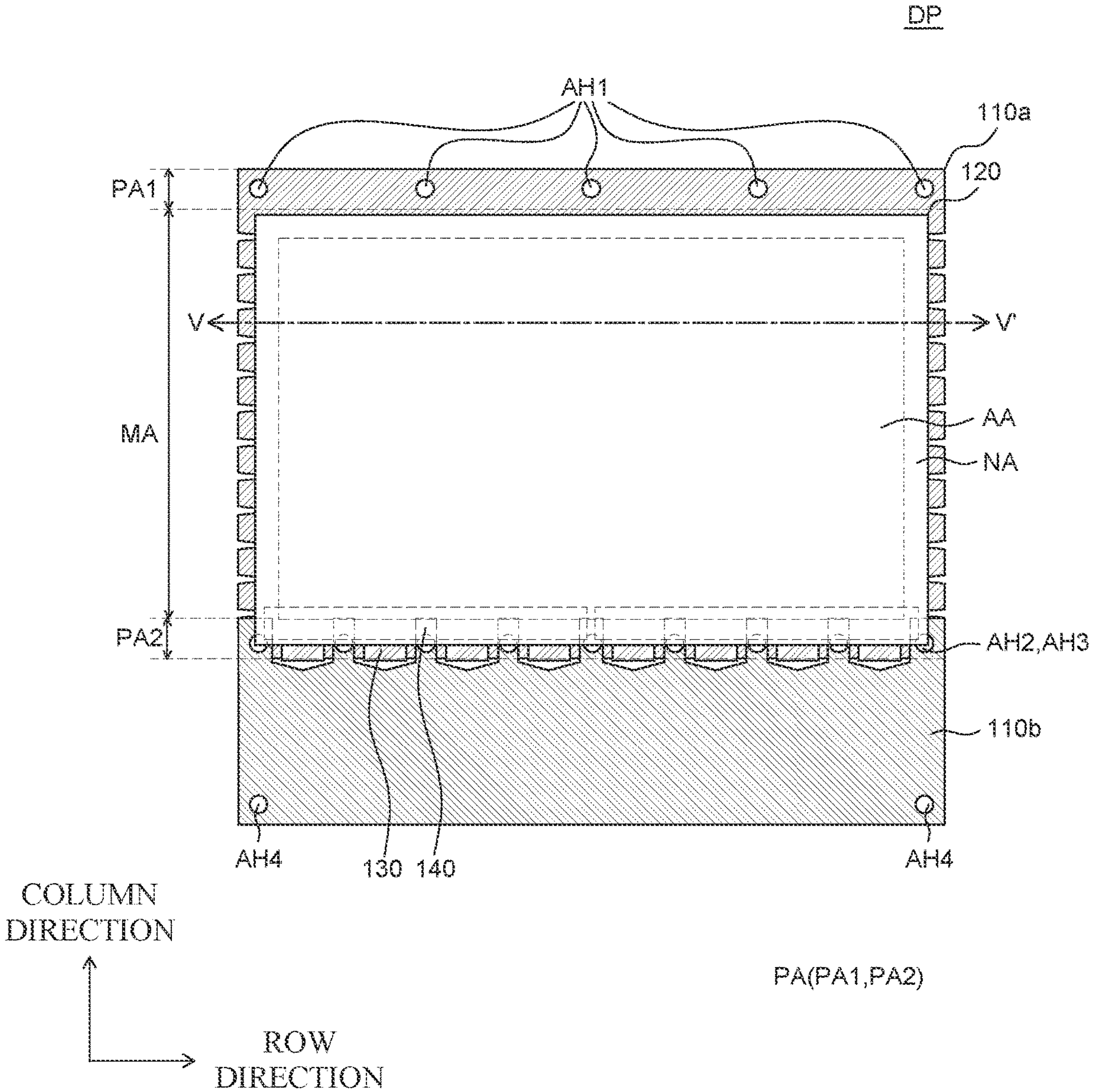
FIG. 4B is a plan view of a display unit of a display device according to an example embodiment of the present disclosure.
Figure 5:
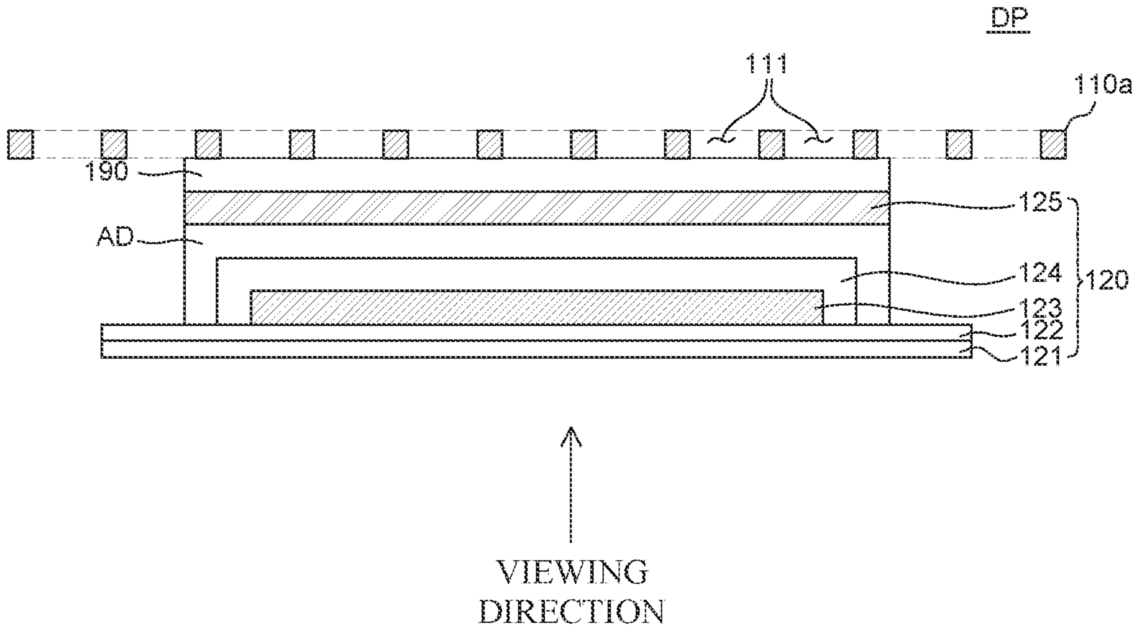
FIG. 5 is a cross-sectional view taken along the line V-V' of FIG. 4B according to an embodiment of the present disclosure.

FIG. 4A is an exploded perspective view for explaining a first cover and a second cover of a display device according to an embodiment of the present disclosure. FIG. 4B is a plan view of a display unit of a display device according to an embodiment of the present disclosure. FIG. 5 is a cross-sectional view taken along the line V-V' of FIG. 4B.

Referring to FIGS. 4A, 4B, and 5, the display unit DP includes a first cover 110*a*, a display panel 120, a plurality of flexible films 130, a printed circuit board 140, a second cover 110*b*, and an adhesive unit 190. However, it is not limited thereto and the display unit DP can be defined to include only a display panel 120, a plurality of flexible films 130, and a printed circuit board 140.

Referring to FIGS. 4A and 4B, the first cover 110*a* is disposed on a rear surface of the display panel 120 to support the display panel 120. The first cover 110*a* is disposed on the rear surface of the display panel 120 so that the first cover can be referred to as a back cover. A size of the first cover 110*a* can be larger than a size of the display panel 120. The first cover 110*a* can protect other configurations of the display unit DP from the outside.

Even though the first cover 110*a* is formed of a material having a rigidity, at least a part of the first cover 110*a* can have a flexibility to be wound or unwound together with the display panel 120. For example, the first cover 110*a* can be formed of a metal material such as steel use stainless SUS or invar, plastic, or the like. However, if the material of the first cover 110*a* satisfies physical conditions, such as a thermal strain amount, a radius of curvature, and a rigidity, the material can be diversely changed depending on the design, and is not limited thereto.

The first cover 110*a* can be fastened with the head bar 172 and the second cover 110*b*.

The first cover 110*a* includes a plurality of support areas PA and a malleable area MA. The plurality of support areas PA is areas where a plurality of openings 111 is not disposed and the malleable area MA (e.g., bending area) is an area where a plurality of openings 111 is disposed. Specifically, the first cover 110*a* includes a first support area PA1, a malleable area MA, and a second support area PA2 and the first support area PA1, the malleable area MA, and the second support area PA2 are sequentially disposed from an uppermost end of the first cover 110*a*. In this situation, since the first cover 110*a* is wound or unwound in a column direction, the plurality of support areas PA and the malleable area MA can be disposed along the column direction.

The first support area PA1 of the first cover 110*a* is an uppermost area of the first cover 110*a* and is fastened with the head bar 172. The first support area PA1 can include first fastening holes AH1 to be fastened with the head bar 172. For example, screws which pass through the head bar 172 and the first fastening holes AH1 are disposed so that the head bar 172 can be fastened with the first support area PA1. As the first support area PA1 is fastened with the head bar 172, when the link unit 171 which is fastened with the head bar 172 is lifted or lowered, the first cover 110*a* is also lifted and lowered together with the display panel 120 which is attached to the first cover 110*a*. Even though five first fastening holes AH1 are illustrated in FIGS. 4A and 4B, the number of first fastening holes AH1 is not limited thereto. Further, even though it has been described that the first cover 110*a* is fastened with the head bar 172 using the first fastening holes AH1, it is not limited thereto and the first cover 110*a*and the head bar 172 can be fastened with each other without using a separate fastening hole.

The malleable area MA of the first cover 110*a* is an area extending from the first support area PA1 to a lower side of the first cover 110*a*. The malleable area MA is an area in which a plurality of openings 111 (e.g., cutout portions) are disposed and the display panel 120 is attached. Specifically, the malleable area MA is an area which is wound around or unwound from the roller 161 together with the display panel 120. The malleable area MA can overlap at least the display panel 120 among other configurations of the display unit DP.

The second support area PA2 of the first cover 110*a* is an area which extends from the malleable area MA and is a lowermost side of the first cover 110*a*. One end of the display panel 120 is disposed in the second support area PA2. For example, a pad area, which is a non-active area at one end of the display panel 120, can be disposed in the second support area PA2.

Referring to FIG. 4A, second fastening holes AH2 are disposed in the second support area PA2. Even though nine second fastening holes AH2 are illustrated in FIG. 4A, the number of second fastening holes AH2 is illustrative and is not limited thereto.

In addition, in the first support area PA1 and the second support area PA2, the plurality of openings 111 as formed in the malleable area MA are not formed in the first and second support areas PA1 and PA2. Specifically, in each of the first support area PA1 and the second support area PA2, only the first fastening holes AH1 and the second fastening holes AH2 are formed, but the plurality of openings 111 as formed in the malleable area MA are absent from the first and second support areas PA1 and PA2. Further, the first fastening holes AH1 and the second fastening holes AH2 have different shapes than the plurality of openings 111.

The first support area PA1 is an area fixed to the head bar 172 and the second support area PA2 is an area where one end of the display panel 120, the plurality of flexible films 130, and the printed circuit board 140 are supported and has a rigidity greater than that of the malleable area MA. Specifically, as the first support area PA1 and the second support area PA2 have the rigidity, the first support area PA1 and the second support area PA2 can be firmly fixed to the head bar 172 and the second cover 110*b*. The second support area PA2 maintains the pad area and the printed circuit board 140 at one end of the display panel 120 to be flat to protect the pad area and the printed circuit board 140 of the display panel 120. Therefore, the display unit DP is fixed to the head bar 172 of the driving unit MP and can move inside or the outside of the housing unit HP in accordance with the operation of the driving unit MP and protect the pad area and the printed circuit board 140 at one end of the display panel 120.

In addition, in FIG. 4A, even though it is illustrated that the plurality of support areas PA and the malleable area MA of the first cover 110*a* are sequentially disposed along the column direction, when the first cover 110*a* is wound in the row direction, the plurality of support areas PA and the malleable area MA can be sequentially disposed along a row direction (e.g., the orientations of the cutout portions can be rotated or aligned in a different direction).

When the display unit DP is wound or unwound, the plurality of openings 111 disposed in the malleable area MA of the first cover 110*a* can be deformed by a stress which is applied to the display unit DP. Specifically, when the display unit DP is wound or unwound, the malleable area MA of the first cover 110*a* can be deformed as the plurality of openings 111 contracts or expands. Further, as the plurality of openings 111 contracts or expands, a slip phenomenon of the display panel 120 disposed on the malleable area MA of the first cover 110*a* is minimized so that the stress which is applied to the display panel 120 can be minimized.

When the display panel 120 and the first cover 110*a* are wound, a difference between a length of the display panel 120 which is wound around the roller 161 and a length of the first cover 110*a* which is wound around the roller 161 can be caused due to the difference of radii of curvature of the display panel 120 and the first cover 110*a*. For example, when the first cover 110*a* and the display panel 120 are wound around the roller 161, a length of the first cover 110*a* required for being wound around the roller 161 once can be different than a length of the display panel 120 required for being wound around the roller 161 once. That is, since the display panel 120 is disposed in a more outer position than the first cover 110*a* with respect to the roller 161, a length of the display panel 120 required to be wound around the roller 161 once can be larger than a length of the first cover 110*a* required to be wound around the roller 161 once. As described above, the winding lengths of the first cover 110*a* and the display panel 120 are different from each other due to the difference of radii of curvature at the time of winding the display unit DP and the display panel 120 attached to the first cover 110*a*, and thus the display panel 120 can slide to be shifted from its original position. In this situation, a phenomenon that the display panel 120 slides from the first cover 110*a* due to the stress and the difference of radii of curvature caused by the winding can be defined as a slip phenomenon. When the slip phenomenon is excessively increased, the display panel 120 can be detached from the first cover 110*a* or defects such as cracks can be caused.

In this situation, in the display device 100 according to an embodiment of the present disclosure, even though the display unit DP is wound or unwound and a stress is applied to the display unit DP, the plurality of openings 111 of the first cover 110*a* is flexibly deformed to relieve the stress applied to the first cover 110*a* and the display panel 120. For example, when the first cover 110*a* and the display panel 120 are wound around the roller 161 along the column direction, a stress which deforms the first cover 110*a* and the display panel 120 in a vertical direction can be applied. In this situation, the plurality of openings 111 of the first cover 110*a* can extend in a vertical direction of the first cover 110*a* and the length of the first cover 110*a* can be flexibly deformed. Therefore, the difference in lengths of the first cover 110*a* and the display panel 120 caused by the difference in radii of curvature during the process of winding the first cover 110*a* and the display panel 120 can be compensated by the plurality of openings 111 of the first cover 110*a*. Further, the plurality of openings 111 is deformed during the process of winding the first cover 110*a* and the display panel 120 so that a stress which is applied to the display panel 120 from the first cover 110*a* can also be relieved.

The second cover 110*b* is fastened with the first cover 110*a* and the roller 161 to connect the first cover 110*a* and the roller 161. The second cover 110*b* can connect the first cover 110*a* and the roller 161 by the above-described method and finally connect the display panel 120 disposed in the first cover 110*a* to the roller 161. However, it is not limited thereto so that as long as the second cover 110*b* is connected to the first cover 110*a* and the roller 161, a shape or a connection method of the second cover 110*b* can vary in various forms depending on the design and is not limited thereto.

One end of the second cover 110*b* which is an uppermost area of the second cover 110*b* can overlap one end of the first cover 110*a*. For example, one end of the second cover 110*b* can overlap the second support area PA2. One end of the second cover 110*b* can overlap a part of the first cover 110*a* to be connected, or one end of the second cover 110*b* can be connected to the part of the first cover 110*a* using a connection member, but is not limited thereto.

The second cover 110*b* can include a plurality of fastening units FP overlapping the first cover 110*a*. The plurality of fastening units FP is disposed at one end of the second cover 110*b*. Further, in the plurality of fastening units FP, a plurality of third fastening holes AH3 to be fastened with the first cover 110*a* can be disposed. The plurality of fastening units FP in which the plurality of third fastening holes AH3 is disposed is spaced apart from each other and a space which allows the plurality of flexible films 130 to be bent can be ensured between the plurality of fastening units FP. Even though nine third fastening holes AH3 are illustrated in FIG. 4A, the number of third fastening holes AH3 is illustrative and is not limited thereto.

In FIG. 4A, the second fastening holes AH2 and the third fastening holes AH3 to be fastened with the first cover 110*a* and the second cover 110*b* are disposed in the second support area PA2 of the first cover 110*a* and one end of the second cover 110*b*, respectively. However, the first cover 110*a* and the second cover 110*b* can be fixed to each other without using a separate fastening hole.

In addition, when the second support area PA2 and the plurality of fastening units FP are wound around the roller 161, an outer circumferential surface of the roller 161 which overlaps the second support area PA2 and the plurality of fastening units FP can be a flat portion 161F. Therefore, the second support area PA2 can always maintain the flat state regardless of being in the wound state or the unwound state with the roller 161, and the pad area at one end of the display panel 120 and the printed circuit board 140 disposed in the second support area PA2 can also maintain the flat state.

An area from one end to the other end of the second cover 110*b* is an area which extends to dispose the active area AA of the display panel 120 outside of the housing unit HP. For example, when the first cover 110*a* and the display panel 120 are fully unwound, an area from the other end of the second cover 110*b* which is fixed to the roller 161 to one end of the second cover 110*b* in which the plurality of flexible films 130 and the printed circuit board 140 are disposed can be disposed in the housing unit HP. The malleable area MA and the first support area PA1 in which the active area AA of the display panel 120 is disposed can be disposed at the outside of the housing unit HP. That is, an area from the other end of the second cover 110*b* fixed to the roller 161 to at least a part of an end of the second cover 110*b* and the second support area PA2 can be disposed in the housing unit HP.

The other end of the second cover 110*b* is a lowermost area of the second cover 110*b* and is fastened with the roller 161. A fourth fastening hole AH4 can be formed at the other end of the second cover 110*b* to be fastened with the roller 161. For example, a fastening member, which passes through the roller 161 and the fourth fastening holes AH4, is disposed to fasten the roller 161 and the other end of the second cover 110*b* with each other. As the other end of the second cover 110*b* is fastened with the roller 161, the display panel 120, the first cover 110*a*, and the second cover 110*b* can be wound around or unwound from the roller 161. Even though two fourth fastening holes AH4 are illustrated in FIG. 4A, the number of fourth fastening holes AH4 is not limited thereto.

In addition, in the second cover 110*b*, the plurality of openings 111 as formed in the malleable area MA of the first cover 110*a* are not formed. Specifically, only the third fastening holes AH3 and the fourth fastening holes AH4 are formed at one end and the other end of the second cover 110*b*, but the plurality of openings 111 as formed in the malleable area MA of the first cover 110*a* are not formed. Further, the third fastening hole AH3 and the fourth fastening hole AH4 have different shapes than the plurality of openings 111.

The second cover 110*b* can be formed of a flexible material to be wound around or unwound from the roller. For example, the second cover 110*b* can be formed of a plastic material such as PET. However, if the material of the second cover 110*b* satisfies physical conditions such as a thermal strain amount, a radius of curvature, and a rigidity, the material can be diversely changed depending on the design, and is not limited thereto.

Referring to FIGS. 4B and 5, the display panel 120 is disposed on one surface of the first cover 110*a*. The display panel 120 is disposed in the malleable area MA, on one surface of the first cover 110*a*. The display panel 120 is a panel for displaying images to a user. The display panel 120 can include a display element which displays images, a driving element which drives the display element, wiring lines which transmit various signals to the display element and the driving element, and the like.

The display element can be defined in different manners depending on the type of the display panel 120. For example, when the display panel 120 is an organic light emitting display panel 120, the display element can be an organic light emitting diode which includes an anode, an organic light emitting layer, and a cathode. For example, when the display panel 120 is a liquid crystal display panel, the display element can be a liquid crystal display element. Hereinafter, even though the display panel 120 is assumed as an organic light emitting display panel, the display panel 120 is not limited to the organic light emitting display panel. Further, since the display device 100 according to the embodiment of the present disclosure is a rollable display device 100, the display panel 120 can be implemented as a flexible display panel 120 to be wound around or unwound from the roller 161.

The display panel 120 includes an active area AA and a non-active area NA.

The active area AA is an area where images are displayed in the display panel 120. In the active area AA, a plurality of sub pixels which configure the plurality of pixels and a driving circuit for driving the plurality of sub pixels can be disposed. The plurality of sub pixels are minimum units which configure the active area AA and a display element can be disposed in each of the plurality of sub pixels. For example, an organic light emitting diode which includes an anode, an organic light emitting layer, and a cathode can be disposed in each of the plurality of sub pixels, but it is not limited thereto. Further, a driving circuit for driving the plurality of sub pixels can include a driving element, a wiring line, and the like. For example, the driving circuit can be configured by a thin film transistor, a storage capacitor, a gate line, a data line, and the like, but is not limited thereto.

The non-active area NA is an area where no image is displayed. In the non-active area NA, various wiring lines, circuits, and the like for driving the organic light emitting diode of the active area AA are disposed. For example, in the non-active area NA, a link line which transmits signals to the plurality of sub pixels and driving circuits of the active area AA or a driving IC such as a gate driver IC or a data driver IC can be disposed, but it is not limited thereto.

In addition, the non-active area NA includes a pad area and a gate driving area.

The pad area is an area in which a plurality of pads are disposed. The plurality of pads is electrodes which electrically connect the plurality of flexible films 130 and the display panel 120 to each other so that the plurality of flexible films 130 and the display panel 120 are electrically connected by the plurality of pads. The pad area can be a non-active area NA which overlaps the second support area PA2 of the first cover 110*a* in the non-active area NA. However, the pad area can be formed in the other part of the non-active area NA depending on the arrangement of the plurality of flexible films 130, but is not limited thereto.

The gate driving area is an area where a gate driver is disposed. The gate driving area can be a non-active area NA at a left side and a right side of the active area AA. The gate driver outputs a gate voltage and an emission control voltage under the control of the timing controller to select a sub pixel in which a data voltage is charged through a wiring line such as a gate line or an emission control signal line and adjust an emission timing. Hereinafter, it is assumed that the gate driver is formed directly on the substrate 121 by a gate-driver in panel, but is not limited thereto. In this situation, the gate driving area where the gate driver is disposed can also be referred to as a GIP area.

Referring to FIG. 5, the display panel 120 includes a substrate 121, a buffer layer 122, a pixel unit 123, an encapsulation layer 124, and an encapsulation substrate 125.

The substrate 121 is a base member which supports various components of the display panel 120 and can be configured by an insulating material. The substrate 121 can be formed of a material having a flexibility to allow the display panel 120 to be wound or unwound. For example, the substrate 121 can be formed of a plastic material such as polyimide (PI).

The buffer layer 122 is disposed on an upper surface of the substrate 121. The buffer layer 122 suppresses moisture and/or oxygen which penetrates from the outside of the substrate 121 from being spread. The buffer layer 122 can be formed of an inorganic material, for example, can be configured by a single layer or a double layer of silicon oxide SiOx and silicon nitride SiNx, but is not limited thereto.

The pixel unit 123 (e.g., pixel layer) is disposed on upper surfaces of the substrate 121 and the buffer layer 122. The pixel unit 123 includes a plurality of organic light emitting diodes and a circuit for driving the plurality of organic light emitting diodes. The pixel unit 123 can be disposed to correspond to the active area AA.

In addition, the display panel 120 can be configured by a top emission type or a bottom emission type, depending on an emission direction of light which is emitted from the organic light emitting diode.

According to the top emission type, light emitted from the organic light emitting diode is emitted to an upper portion of the substrate 121 on which the organic light emitting diode is formed. In the situation of the top emission type, a reflective layer can be formed below the anode to allow the light emitted from the organic light emitting diode to travel to the upper portion of the substrate 121, that is, toward the cathode.

According to the bottom emission type, light emitted from the organic light emitting diode is emitted to a lower portion of the substrate 121 on which the organic light emitting diode is formed. In the situation of the bottom emission type, the anode can be formed only of a transparent conductive material and the cathode can be formed of the metal material having a high reflectance to allow the light emitted from the organic light emitting diode to travel to the lower portion of the substrate 121.

Hereinafter, for the convenience of description, the description will be made by assuming that the display device 100 according to an embodiment of the present disclosure is a bottom emission type display device, but it is not limited thereto.

The encapsulation layer 124 is disposed to cover the pixel unit 123. The encapsulation layer 124 seals the organic light emitting diode of the pixel unit 123. The encapsulation layer 124 can protect the organic light emitting diode of the pixel unit 123 from moisture, oxygen, and impacts of the outside. The encapsulation layer 124 can be formed by alternately laminating a plurality of inorganic layers and a plurality of organic layers. For example, the inorganic layer can be formed of an inorganic material such as silicon nitride SiNx, silicon oxide SiOx, and aluminum oxide AlOx and the organic layer can be formed of epoxy or acrylic polymer, but they are not limited thereto.

The encapsulation substrate 125 is disposed on the encapsulation layer 124. Specifically, the encapsulation substrate 125 is disposed between the encapsulation layer 124 and the first cover 110*a*. The encapsulation substrate 125 can protect the organic light emitting diode of the pixel unit 123 together with the encapsulation layer 124. The encapsulation substrate 125 can protect the organic light emitting diode of the pixel unit 123 from moisture, oxygen, and impacts of the outside. For example, the encapsulation substrate 125 can be formed of a material having a high modulus of approximately 200 to 900 MPa. The encapsulation substrate 125 can be formed of a metal material, which has a high corrosion resistance and is easily processed in the form of a foil or a thin film, such as aluminum (Al), nickel (Ni), chromium (Cr), and an alloy material of iron (Fe) and nickel. Therefore, as the encapsulation substrate 125 is formed of a metal material, the encapsulation substrate 125 can be implemented as an ultra-thin film and provide a strong resistance against external impacts and scratches.

An adhesive layer AD can be disposed between the encapsulation layer 124 and the encapsulation substrate 125. The adhesive layer AD can bond the encapsulation layer 124 and the encapsulation substrate 125 to each other. The adhesive layer AD is formed of a material having adhesiveness and can be a thermosetting or natural curable type adhesive. For example, the adhesive layer AD can be formed of an optical clear adhesive (OCA), a pressure sensitive adhesive (PSA), or the like, but is not limited thereto.

In addition, the adhesive layer AD can be disposed to enclose the encapsulation layer 124 and the pixel unit 123. That is, the pixel unit 123 can be sealed by the buffer layer 122 and the encapsulation layer 124 and the encapsulation layer 124 and the pixel unit 123 can be sealed by the buffer layer 122 and the adhesive layer AD. The adhesive layer AD can protect the organic light emitting diode of the pixel unit 123 from moisture, oxygen, and impacts of the outside together with the encapsulation layer 124 and the encapsulation substrate 125. In this situation, the adhesive layer AD can further include an absorbent. The moisture absorbent can be particles having hygroscopicity and absorb moisture and oxygen from the outside to minimize permeation of the moisture and oxygen into the pixel unit 123.

Referring to FIG. 5, an adhesive unit 190 which bonds the display panel 120 and the first cover 110*a* is disposed. The adhesive unit 190 is disposed between the display panel 120 and the first cover 110*a* to bond the display panel 120 and the first cover 110*a*. The adhesive unit 190 can bond the display panel 120 and the first cover 110*a* by bonding the encapsulation substrate 125 and the first cover 110*a*. The adhesive unit 190 can be disposed between the encapsulation substrate 125 and the first cover 110*a* and bond the encapsulation substrate 125 and the first cover 110*a*. The adhesive unit 190 will be described below in more detail with reference to FIG. 6.

In addition, a polarizing plate can be disposed on a rear surface of the display panel 120. The polarizing plate selectively transmits light to reduce the reflection of external light which is incident onto the display panel 120. Specifically, the display panel 120 includes various metal materials applied to the semiconductor element, the wiring line, the organic light emitting diode, and the like. Therefore, the external light incident onto the display panel 120 can be reflected from the metal material so that the visibility of the display device 100 can be reduced due to the reflection of the external light. Therefore, when the polarizing plate is disposed, the polarizing plate suppresses the reflection of the external light to increase the outdoor visibility of the display device 100. However, the polarizing plate can be omitted depending on an implementation example of the display device 100.

Referring to FIG. 4B, a plurality of flexible films 130 are disposed at one end of the display panel 120. The plurality of flexible films 130 are films in which various components are disposed on a base film having a malleability to supply a signal to the plurality of sub pixels and the driving circuits which configure the plurality of pixels of the active area AA and is electrically connected to the display panel 120. One end of each the plurality of flexible films 130 is disposed in the non-active area NA of the display panel 120 to supply a power voltage, a data voltage, or the like to the plurality of sub pixels and the driving circuits of the active area AA. In addition, even though the number of the plurality of flexible films 130 is eight in FIG. 4B, the number of flexible films 130 can vary depending on the design, but is not limited thereto.

In addition, a driving IC, such as a gate driver IC or a data driver IC, can be disposed on the base film of the plurality of flexible films 130. The driving IC is a component which processes data for displaying images and a driving signal for processing the data. The driving IC can be disposed by a chip on glass (COG), a chip on film (COF), a tape carrier package (TCP), or the like depending on a mounting method. However, for the convenience of description, in FIG. 4B, it is illustrated that the driving IC is mounted on the plurality of flexible films 130 by a chip on film technique, but is not limited thereto.

In addition, the plurality of flexible films 130 are components in which a base film, data for displaying images on the base film, and various driving ICs which control the data are disposed to display images. The plurality of flexible films 130 are electrically connected to the pad area at one end of the display panel 120 to be bent toward a rear surface of the first cover 110*a*. One end of each the plurality of flexible films 130 is connected to one end of the display panel 120 on one surface of the first cover 110*a*, and the other end of each of the plurality of flexible films 130 can be disposed at an opposite surface of the one surface of the first cover 110*a*, but is not limited thereto.

Referring to FIG. 4B, the printed circuit board 140 is disposed on the rear surface of the first cover 110*a* to be connected to the plurality of flexible films 130. That is, the printed circuit board 140 is disposed on the rear surface of the first cover 110*a* to be electrically connected to the plurality of flexible films 130. The printed circuit board 140 is a component which supplies signals to the driving IC of the plurality of flexible films 130. Various components can be disposed in the printed circuit board 140 to supply various signals, such as a driving signal or a data signal to the driving IC. In addition, even though two printed circuit boards 140 are illustrated in FIG. 4B, the number of printed circuit boards 140 can vary depending on the design and is not limited thereto.

In addition, an additional printed circuit board which is connected to the printed circuit board 140 can be further disposed. For example, the printed circuit board 140 can be referred to as a source printed circuit board S-PCB on which the data driver is mounted and the additional printed circuit board connected to the printed circuit board 140 can be referred to as a control printed circuit board C-PCB on which a timing controller is mounted. The additional printed circuit board can be disposed in the roller 161 or disposed in the housing unit HP at the outside of the roller 161, or disposed to be in direct contact with the printed circuit board 140.

Hereinafter, the adhesive unit will be described in more detail with reference to FIG. 6 together.

Adhesive Unit

Figure 6:
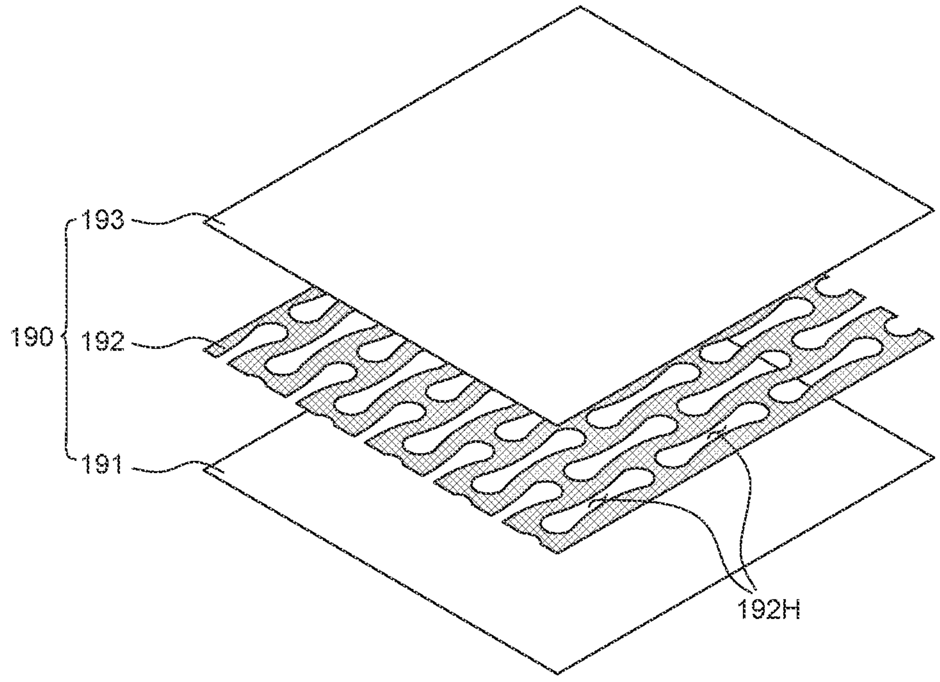
FIG. 6 is an exploded perspective view of an adhesive unit of a display device according to an example embodiment of the present disclosure.

FIG. 6 is an exploded perspective view of an adhesive unit according to an embodiment of the present disclosure.

Referring to FIG. 6, the adhesive unit 190 includes a first adhesive member 191, a base layer 192, and a second adhesive member 193. That is, the adhesive unit 190 has a triple-layered structure in which the first adhesive member 191 and the second adhesive member 193 are disposed on opposite surfaces of the base layer 192.

The first adhesive member 191 is disposed between the display panel 120 and the base layer 192. Therefore, the first adhesive member 191 functions to bond the adhesive unit 190 to the display panel 120.

The first adhesive member 191 is formed of a material having adhesiveness and can be a thermosetting or natural curable type adhesive. For example, the first adhesive member 191 can be formed of an acrylic material such as optical clear adhesive OCA or pressure sensitive adhesive (PSA), but is not limited thereto and can vary depending on the design.

The base layer 192 has a rigidity which supports a structure to be bonded to the adhesive unit 190 and a flexibility to be rolled as the roller unit 160 is wound or unwound. For example, the base layer 192 can be formed of a plastic-based material such as thermoplastic olefinic elastomer (TPO), polyurethane (PU), or polyethylene terephthalate (PET), but is not limited thereto and can vary depending on the design.

The base layer 192 is disposed on the first adhesive member 191. That is, the base layer 192 can be disposed between the first adhesive member 191 and the second adhesive member 193.

The base layer 192 can have a plurality of patterns. The plurality of patterns can have a hole (192H) shape. The hole 192H which is a plurality of patterns can have the same shape as the opening 111 of the first cover 110*a*, but is not limited thereto (e.g., the hole 192H and the opening 111 can have a stadium shape, a rounded bowtie shape or a dumbbell shape).

The second adhesive member 193 is disposed between the base layer 192 and the first cover 110*a*. Therefore, the second adhesive member 193 functions to bond the adhesive unit 190 to the first cover 110*a*.

The second adhesive member 193 is formed of a material having adhesiveness and can be a thermosetting or natural curable type adhesive. For example, the second adhesive member 193 can be formed of an acrylic material, such as optical clear adhesive OCA or pressure sensitive adhesive PSA, but is not limited thereto and can vary depending on the design.

Placement Relationship of First Cover and Adhesive Unit

Figure 7A:
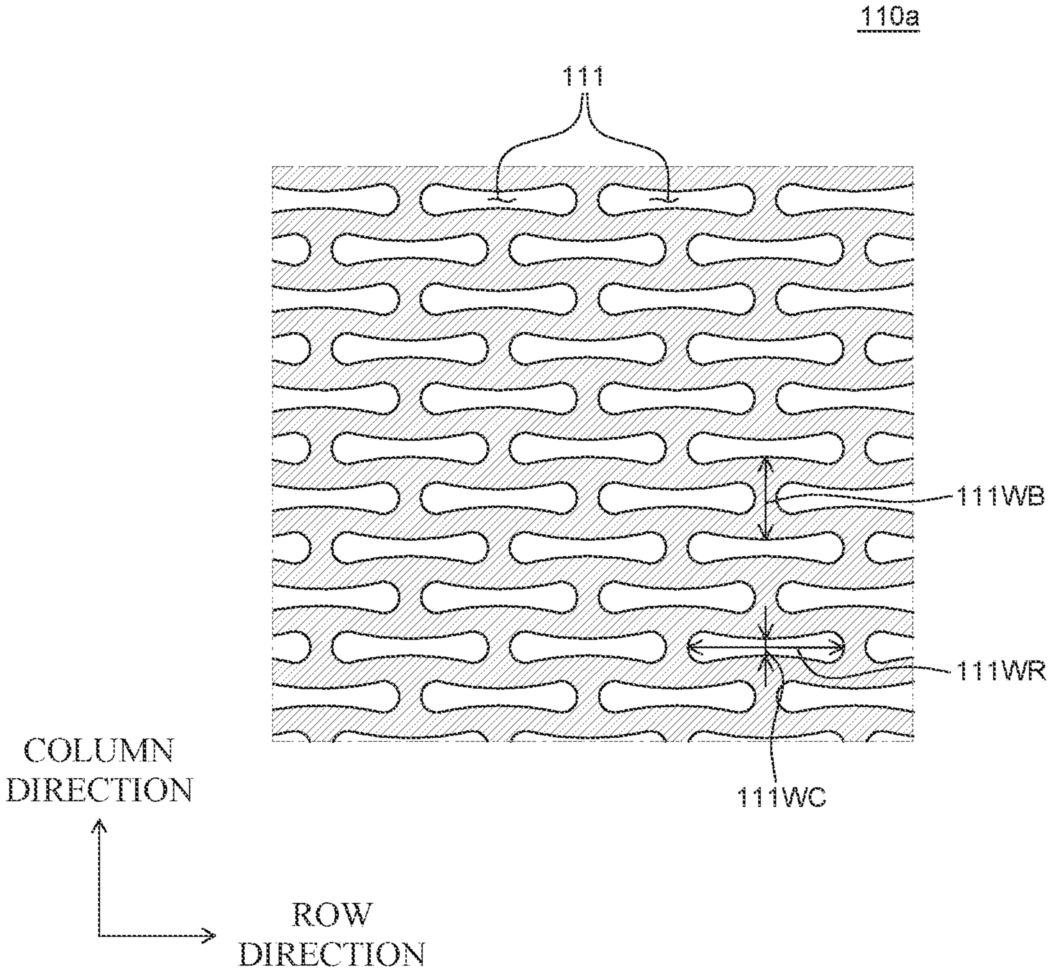
FIG. 7A is an enlarged plan view of a first cover of a display device according to an example embodiment of the present disclosure.
Figure 7B:
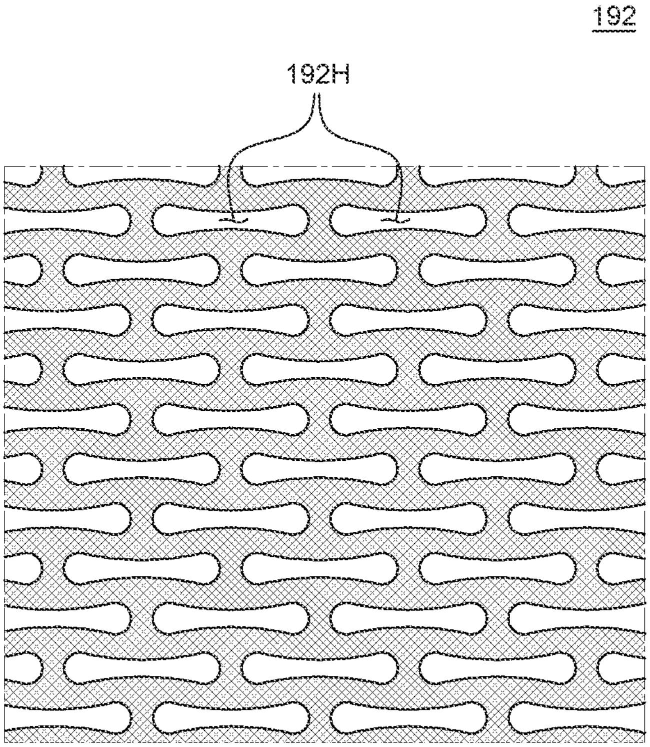
FIG. 7B is an enlarged plan view of a base layer of an adhesive unit of a display device according to an example embodiment of the present disclosure.
Figure 7C:
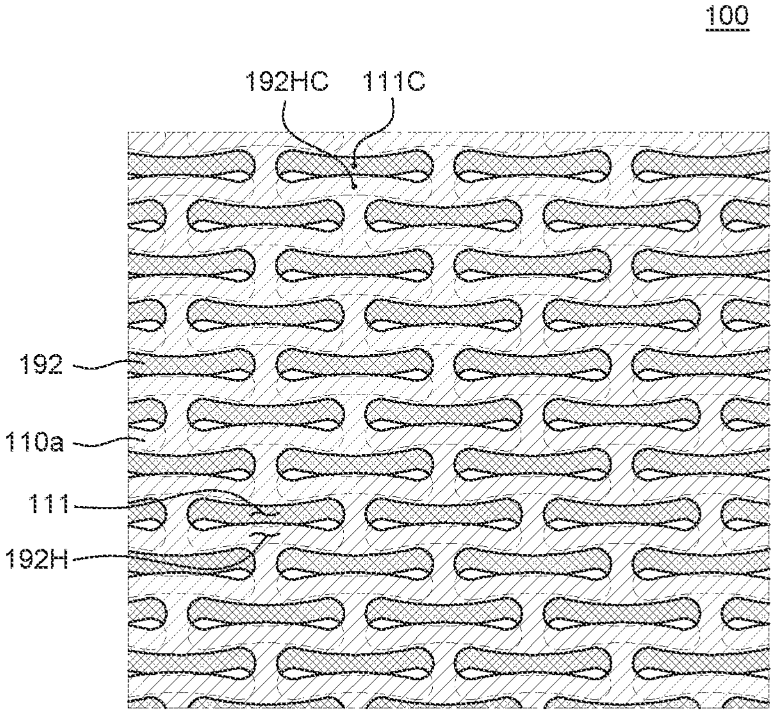
FIG. 7C is an enlarged plan view for explaining an overlapping state of a first cover and a base layer of a display device according to an example embodiment of the present disclosure.

FIG. 7A is an enlarged plan view of a first cover of a display device according to an embodiment of the present disclosure. FIG. 7B is an enlarged plan view of a base layer of an adhesive unit of a display device according to an embodiment of the present disclosure. FIG. 7C is an enlarged plan view for explaining an overlapping state of a first cover and a base layer of a display device according to an embodiment of the present disclosure. FIG. 7C is an enlarged plan view illustrating a state in which the first cover is disposed on the base layer.

Referring to FIG. 7A, the first cover 110*a* can include a plurality of openings 111. The plurality of openings 111 can have a width 111WC of each of the plurality of openings 111 in the column direction which is smaller than a width 111WR of each of the plurality of openings 111 in the row direction to allow the first cover 110*a* to be wound or unwound. Therefore, when the display panel 120 and the first cover 110*a* are wound or unwound by the roller unit 160, a stress applied to the display panel 120 and the first cover 110*a* can be minimized by the plurality of openings 111 to provide a reliable rollable display device 100.

Specifically, referring to FIG. 7A, the plurality of openings 111 are disposed to be staggered from a plurality of openings 111 in adjacent rows. For example, a plurality of openings 111 disposed in one row is disposed to be staggered from a plurality of openings 111 disposed in a row adjacent to the row. Specifically, centers of the plurality of openings 111 disposed in an odd-numbered row and centers of the plurality of openings 111 disposed in an even-numbered row are disposed to be staggered and for example, can be staggered by a half of a width 111WR in a row direction of the openings 111. However, the placement of the plurality of openings 111 illustrated in FIG. 7A is just an example, and is not limited thereto.

As the plurality of openings 111 are disposed to be staggered, a distance 111WB between a plurality of openings 111 with centers matching in a column direction can be minimized. Specifically, an area between the plurality of openings 111 with centers matching in a column direction in the malleable area MA can have a rigidity. When the first cover 110*a* is wound, the first cover 110*a* needs to be bent in a column direction so that as the distance 111WB of some area between the plurality of openings 111 with centers matching in the column direction becomes longer, it can be difficult for the first cover 110*a* to be bent in the column direction. In this situation, since the plurality of openings 111 are disposed to be staggered in the unit of row, as compared with the situation that the openings are not staggered in the unit of row, the distance 111WB between the plurality of openings 111 with centers matching in the column direction can be minimized and the area between the plurality of openings 111 can also be minimized. Accordingly, the distance 111WB between the plurality of openings 111 with centers matching in the column direction is reduced and continuously extends in the column direction in the malleable area MA so that an area where the plurality of openings 111 are not disposed is removed or reduced. Therefore, the distance 111WB of the area between the plurality of openings 111 having a rigidity in the column direction is minimized so that the rigidity of the first cover 110*a* can be improved without interrupting the winding or unwinding of the first cover 110*a*.

Referring to FIG. 7A, a maximum width 111WR of each of the plurality of openings 111 in the row direction is larger than a maximum width 111WC in the column direction. That is, as illustrated in FIG. 7A, the maximum width 111WR of each of the plurality of openings 111 in a horizontal direction can be larger than the maximum width 111WC of each of the plurality of openings 111 in a vertical direction. In FIG. 7A, it is illustrated that each the plurality of openings 111 has a dumbbell shape, but is not limited thereto and the plurality of openings 111 can have various shapes, such as a polygonal shape or an oval shape or a stadium shape.

As the width 111WR of the plurality of openings 111 in the row direction is increased, the malleable area MA of the first cover 110*a* can be flexibly deformed. Specifically, when the first cover 110*a* is wound, the first cover 110*a* can be bent in the column direction of the first cover 110*a* and the stress can be applied so that the plurality of openings 111 extends in the column direction. In this situation, when the width 111WR of the plurality of openings 111 in the row direction is increased, if the plurality of openings 111 is stretched in the column direction, the width 111WC of the plurality of openings 111 extending in the column direction can be increased. Further, as the plurality of openings 111 extends in the column direction, the stress applied to the malleable area MA may be relieved. Therefore, the malleable area MA of the first cover 110*a* is easily wound or unwound by increasing the width 111WR of the plurality of openings 111 in the row direction and the stress applied to the malleable area MA can be relieved.

Referring to FIG. 7B, the base layer 192 can have a plurality of patterns. The plurality of patterns can have hole (192H) shapes. At this time, the shape of each of the plurality of holes 192H can have the same shape as the opening 111 of the first cover 110*a*. Widths of the plurality of holes 192H which is a plurality of patterns in the column direction can be smaller than widths of the plurality of holes 192H in the row direction.

Referring to FIG. 7B, sizes of the plurality of holes 192H can be equal to sizes of the plurality of openings 111. That is, a size of each of the plurality of holes 192H can be equal to a size of each of the plurality of openings 111. Here, when the sizes of the hole 192H and the opening 111 are equal, it means that an area occupied by one hole 192H is equal to an area occupied by one opening 111 on the plane.

Referring to FIG. 7C, the plurality of holes 192H and the plurality of openings 111 can be alternately disposed. That is, a center 192HC of the hole 192H can be disposed in a different position than a center 111C of the opening 111. When the center 192HC of the hole 192H and the center 111C of the opening 111 match, the base layer 192 and the first cover 110*a* can completely overlap on the plane. However, as described above, the center 192HC of the hole 192H and the center 111C of the opening 111 are disposed at different positions, so that the hole 192H and the opening 111 can be alternately disposed as illustrated in FIG. 7C. At this time, an area of the base layer 192 excluding the plurality of holes 192H can overlap at least a part of the plurality of openings 111 of the first cover 110*a*.

In a rollable display device, an adhesive unit which includes a base layer and adhesive members disposed on both surfaces of the base layer is used to bond the first cover and the display panel. The adhesive member of the adhesive unit has a relatively low modulus so that the adhesive member simultaneously performs a function of bonding other components and a function of absorbing a stress generated in the display device to perform a function of reducing a maximum stress generated at an outermost periphery of the display device. However, the base layer has a relatively high modulus so that a modulus of the entire adhesive unit is increased and a stress absorbing function is reduced. Therefore, when the rollable display device is used for a long time or high temperature and high humidity reliability is evaluated, there can be a problem in that a component of the display device, for example, a component such as a polarizing plate can be cracked.

Therefore, it was reviewed to bond the first cover and the display panel using only an adhesive member which is formed of a material having a low modulus such as PSA without using the base layer. However, when the base layer is removed and only the adhesive member is used, residual adhesive leakage phenomenon that the adhesive member is leaked between the openings of the first cover can occur due to the low modulus of the adhesive member. Further, the adhesive member leaked between the openings of the first cover is disposed on a surface of the display panel on which the image is displayed during the winding or unwinding process and the leaked adhesive member is visible to the user or causes the damage of the display panel.

Therefore, in the display device 100 according to an embodiment of the present disclosure, the base layer 192 of the adhesive unit 190 has a plurality of patterns to reduce a modulus of the adhesive unit 190. Specifically, the base layer 192 can have a plurality of patterns having a shape of the hole 192H. Accordingly, in the display device 100 according to an embodiment of the present disclosure, the base layer 192 having the plurality of holes 192H is used to reduce the modulus of the base layer 192 and reduce the stress at an outermost periphery of the display device 100 by a stress decoupling effect. Therefore, a crack generated in the display device 100 can be minimized and the reliability of the display device 100 can be improved.

Further, in the display device 100 according to the example embodiment of the present disclosure, the base layer 192 of the adhesive unit 190 has a plurality of patterns so that the residual adhesive leakage phenomenon of the adhesive members 191 and 193 through the opening 111 of the first cover 110*a* can also be minimized. Specifically, the plurality of holes 192H of the base layer 192 can have the same shape and the same size as the plurality of openings 111 of the first cover 110*a* and the plurality of holes 192H can be alternately disposed with the plurality of openings 111. Therefore, an area of the base layer 192 excluding the plurality of holes 192H can overlap at least a part of the plurality of openings 111 of the first cover 110*a*. Accordingly, in the display device 100 according to the example embodiment of the present disclosure, overlapping of an area of the adhesive unit 190 excluding the base layer 192 and the plurality of openings 111 of the first cover 110*a* is minimized to reduce the modulus. Therefore, when the display device 100 is used for a long time, the residual adhesive leakage phenomenon which is a leakage phenomenon of the adhesive members 191 and 193 through the plurality of openings 111 of the first cover 110*a* can be improved. Further, the damage of the display panel 120 due to the leaked adhesive members 191 and 193 and the phenomenon in which the leaked adhesive members 191 and 193 are visible to the user can also be minimized.

Figure 8A:
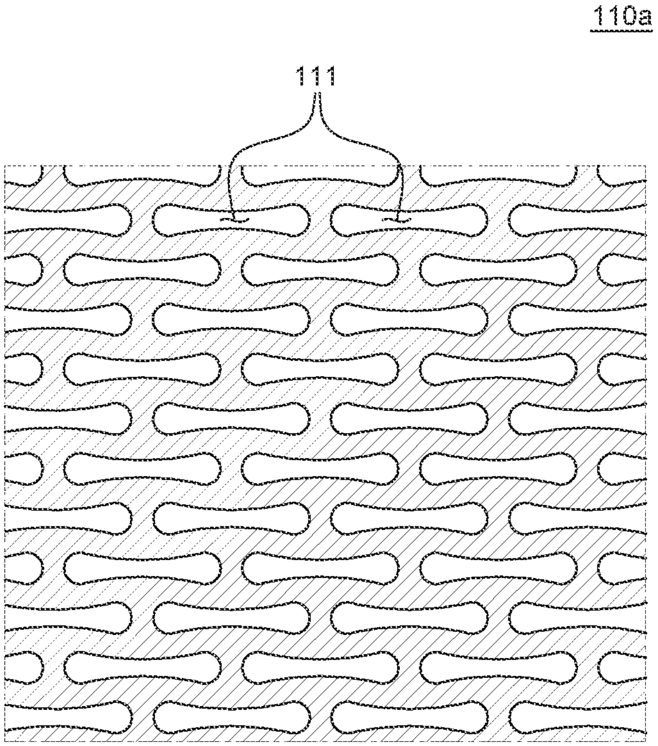
FIG. 8A is an enlarged plan view of a first cover of a display device according to another example embodiment of the present disclosure.
Figure 8B:
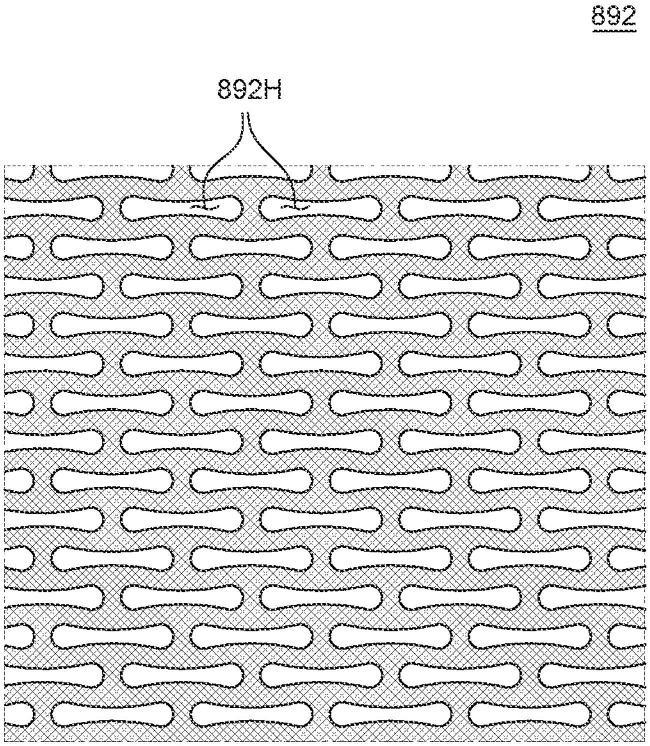
FIG. 8B is an enlarged plan view of a base layer of an adhesive unit of a display device according to another example embodiment of the present disclosure.
Figure 8C:
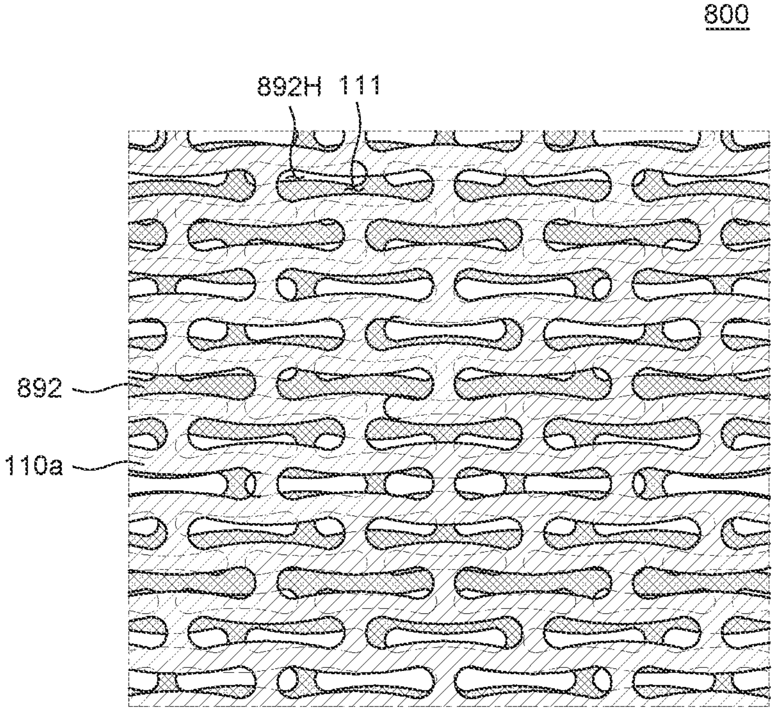
FIG. 8C is an enlarged plan view for explaining an overlapping state of a first cover and a base layer of a display device according to another example embodiment of the present disclosure.

FIG. 8A is an enlarged plan view of a first cover of a display device according to another example embodiment of the present disclosure. FIG. 8B is an enlarged plan view of a base layer of an adhesive unit of a display device according to another example embodiment of the present disclosure. FIG. 8C is an enlarged plan view for explaining an overlapping state of a first cover and a base layer of a display device according to another example embodiment of the present disclosure. The only difference between a display device 800 of FIGS. 8A to 8C and the display device 100 of FIGS. 1A to 7C is a base layer 892, but other configurations are substantially the same, so that a redundant description will be omitted.

Referring to FIG. 8A, the first cover 110*a* can include a plurality of openings 111. The plurality of openings 111 can have a width of the plurality of openings 111 in the column direction which is smaller than a width of the plurality of openings 111 in the row direction to allow the first cover 110*a* to be wound or unwound. Therefore, when the display panel 120 and the first cover 110*a* are wound or unwound by the roller unit 160, a stress which is applied to the display panel 120 and the first cover 110*a* can be minimized by the plurality of openings 111 to provide a reliable rollable display device 800.

Referring to FIG. 8B, shapes of the plurality of patterns of the base layer 892 can be the same as the shapes of the plurality of openings 111. Therefore, the plurality of patterns can have a shape of each of the plurality of holes 892H. That is, widths of the plurality of holes 892H which is a plurality of patterns in the column direction can be smaller than widths of the plurality of holes 892H in the row direction.

Referring to FIG. 8B, sizes of the plurality of holes 892H which is a plurality of patterns can be different than sizes of the plurality of openings 111. Further, sizes of the plurality of holes 892H can be smaller than sizes of the plurality of openings 111. That is, a size of each of the plurality of holes 892H can be smaller than a size of each of the plurality of openings 111. Here, when the size of the hole 892H is smaller than a size of the opening 111, it means that an area occupied by one hole 892H is smaller than an area occupied by one opening 111 on the plane.

Referring to FIG. 8C, the plurality of holes 892H and the plurality of openings 111 can be irregularly alternately disposed. As described above, the sizes of the plurality of holes 892H which is a plurality of patterns can be different from the sizes of the plurality of openings 111 and the sizes of the plurality of holes 892H can be smaller than the sizes of the plurality of openings 111. As the sizes of the plurality of holes 892H are smaller than the sizes of the plurality of openings 111, an overlapping area of each of the plurality of openings 111 and the plurality of holes 892H can be irregular. Therefore, an area of the base layer 892 excluding the plurality of holes 892H can overlap at least a part of the plurality of openings 111 of the first cover 110*a*.

In the display device 800 according to another example embodiment of the present disclosure, the base layer 892 of the adhesive unit has a plurality of patterns to reduce the modulus of the adhesive unit. Specifically, the base layer 892 can have a plurality of patterns each having a shape of the hole 892H. Accordingly, in the display device 800 according to another example embodiment of the present disclosure, the base layer 892 having the plurality of holes 892H is used to reduce the modulus of the base layer 892 and reduce the stress at an outermost periphery of the display device 800 by a stress decoupling effect. Therefore, a crack generated in the display device 800 can be minimized and the reliability of the display device 800 can be improved.

Further, in the display device 800 according to another example embodiment of the present disclosure, the base layer 892 of the adhesive unit has a plurality of patterns so that the residual adhesive leakage phenomenon of the adhesive members 191 and 193 through the opening 111 of the first cover 110*a* can also be minimized. Specifically, the plurality of holes 892H of the base layer 892 can have the same shape as the plurality of openings 111 of the first cover 110*a* and the plurality of holes 892H of the base layer 892 has a size smaller than that of the plurality of openings 111 of the first cover 110*a*. Therefore, the plurality of holes 892H can be irregularly alternately disposed with the plurality of openings 111. Therefore, an area of the base layer 892 excluding the plurality of holes 892H can overlap at least a part of the plurality of openings 111 of the first cover 110*a*. Accordingly, in the display device 800 according to another example embodiment of the present disclosure, overlapping of an area of the adhesive unit excluding the base layer 892 and the plurality of openings 111 of the first cover 110*a* is minimized to reduce the modulus. Therefore, when the display device 800 is used for a long time, the residual adhesive leakage phenomenon which is a leakage phenomenon of the adhesive members 191 and 193 through the plurality of openings 111 of the first cover 110*a* can be improved. Further, the damage of the display panel 120 due to the leaked adhesive members 191 and 193 and the phenomenon in which the leaked adhesive members 191 and 193 are visible to the user can also be minimized.

Figure 9A:
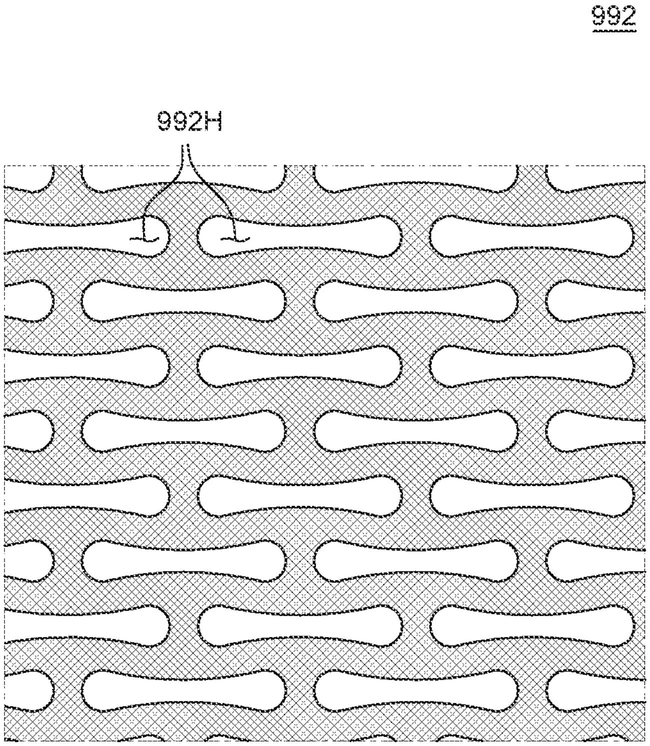
FIG. 9A is an enlarged plan view of a base layer of an adhesive unit of a display device according to still another example embodiment of the present disclosure.
Figure 9B:
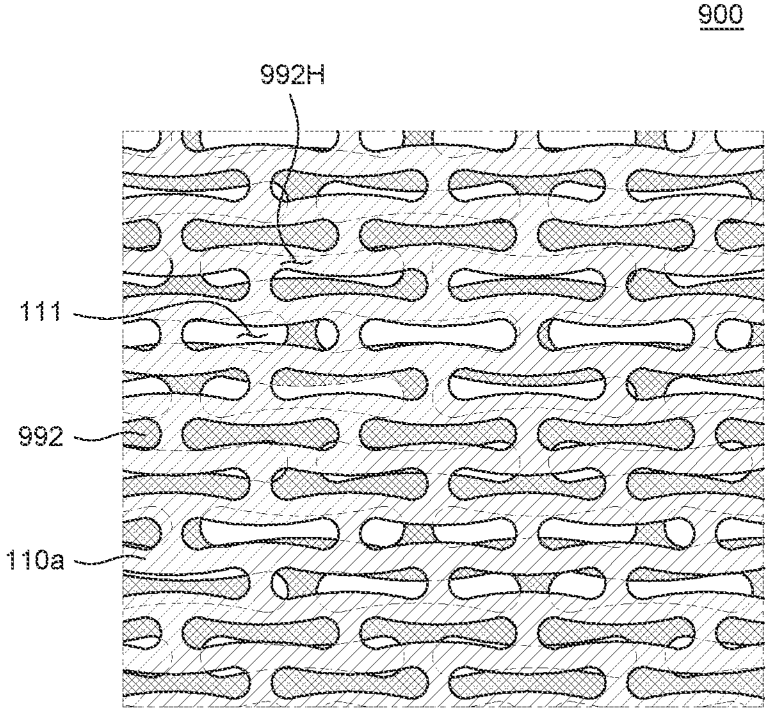
FIG. 9B is an enlarged plan view for explaining an overlapping state of a first cover and a base layer of a display device according to still another example embodiment of the present disclosure.

FIG. 9A is an enlarged plan view of a base layer of an adhesive unit of a display device according to still another example embodiment of the present disclosure. FIG. 9B is an enlarged plan view for explaining an overlapping state of a first cover and a base layer of a display device according to still another example embodiment of the present disclosure. The only difference between a display device 900 of FIGS. 9A and 9B and the display device 100 of FIGS. 1A to 7C is a base layer 992, but other configurations are substantially the same, so that a redundant description will be omitted.

Referring to FIG. 9A, shapes of a plurality of patterns of a base layer 992 can be the same as the shape of each of the plurality of openings 111. Therefore, the plurality of patterns can have a shape of each of the plurality of holes 892H. That is, widths of the plurality of holes 892H which is a plurality of patterns in the column direction can be smaller than widths of the plurality of holes 892H in the row direction.

Referring to FIG. 9A, sizes of a plurality of holes 992H which is a plurality of patterns can be different than sizes of the plurality of openings 111. Further, sizes of the plurality of holes 992H can be larger than sizes of the plurality of openings 111. That is, a size of each of the plurality of holes 992H can be larger than a size of each of the plurality of openings 111. Here, when the size of the hole 992H is larger than a size of the opening 111, it means that an area occupied by one hole 992H is larger than an area occupied by one opening 111 on the plane.

Referring to FIG. 9B, a plurality of holes 992H and the plurality of openings 111 can be irregularly alternately disposed. As described above, the sizes of the plurality of holes 992H which is a plurality of patterns can be different than the sizes of the plurality of openings 111 and the sizes of the plurality of holes 992H can be larger than the sizes of the plurality of openings 111. As the sizes of the plurality of holes 992H are larger than the sizes of the plurality of openings 111, an overlapping area of each of the plurality of openings 111 and the plurality of holes 992H can be irregular. Therefore, an area of the base layer 992 excluding the plurality of holes 992H can overlap at least a part of the plurality of openings 111 of the first cover 110*a*.

In the display device 900 according to still another example embodiment of the present disclosure, the base layer 992 of the adhesive unit has a plurality of patterns to reduce the modulus of the adhesive unit. Specifically, the base layer 992 can have a plurality of patterns having a shape of the hole 992H. Accordingly, in the display device 900 according to still another example embodiment of the present disclosure, the base layer 992 having the plurality of holes 992H is used to reduce the modulus of the base layer 992 and reduce the stress at an outermost periphery of the display device 900 by a stress decoupling effect. Therefore, a crack generated in the display device 900 can be minimized and the reliability of the display device 900 can be improved.

Further, in the display device 900 according to another example embodiment of the present disclosure, the base layer 992 of the adhesive unit has a plurality of patterns so that the residual adhesive leakage phenomenon of the adhesive members 191 and 193 through the opening 111 of the first cover 110*a* can also be minimized. Specifically, the plurality of holes 992H of the base layer 992 can have the same shape as the plurality of openings 111 of the first cover 110*a* and the plurality of holes 992H of the base layer 992 has different sizes, that is, a larger size than that of the plurality of openings 111 of the first cover 110*a*. Therefore, the plurality of holes 992H can be irregularly alternately disposed with the plurality of openings 111. Therefore, an area of the base layer 992 excluding the plurality of holes 992H can overlap at least a part of the plurality of openings

111 of the first cover 110*a*. Accordingly, in the display device 900 according to still another example embodiment of the present disclosure, overlapping of an area of the adhesive unit excluding the base layer 992 and the plurality of openings 111 of the first cover 110*a* is minimized to reduce the modulus. Therefore, when the display device 900 is used for a long time, the residual adhesive leakage phenomenon which is a leakage phenomenon of the adhesive members 191 and 193 through the plurality of openings 111 of the first cover 110*a* can be improved. Further, the damage of the display panel 120 due to the leaked adhesive members 191 and 193 and the phenomenon in which the leaked adhesive members 191 and 193 are visible to the user can also be minimized.

Figure 10A:
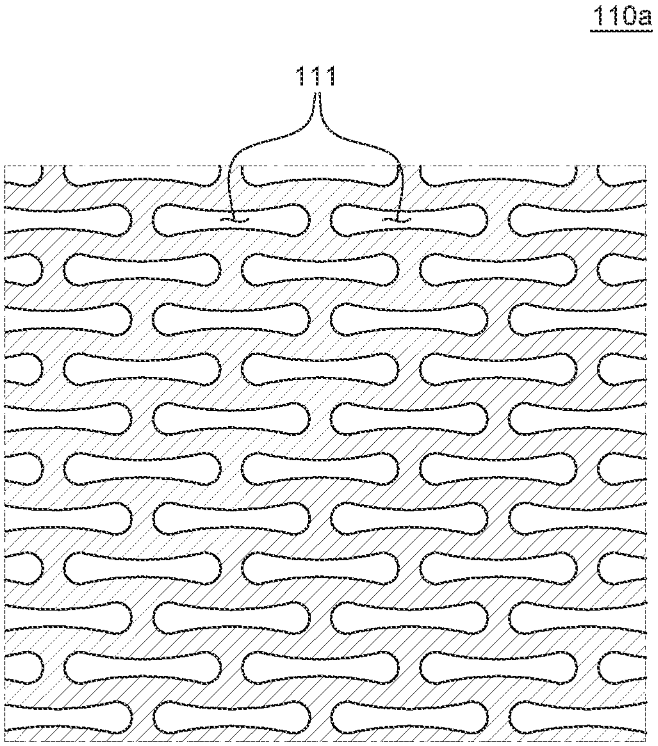
FIG. 10A is an enlarged plan view of a first cover of a display device according to still another example embodiment of the present disclosure.
Figure 10B:
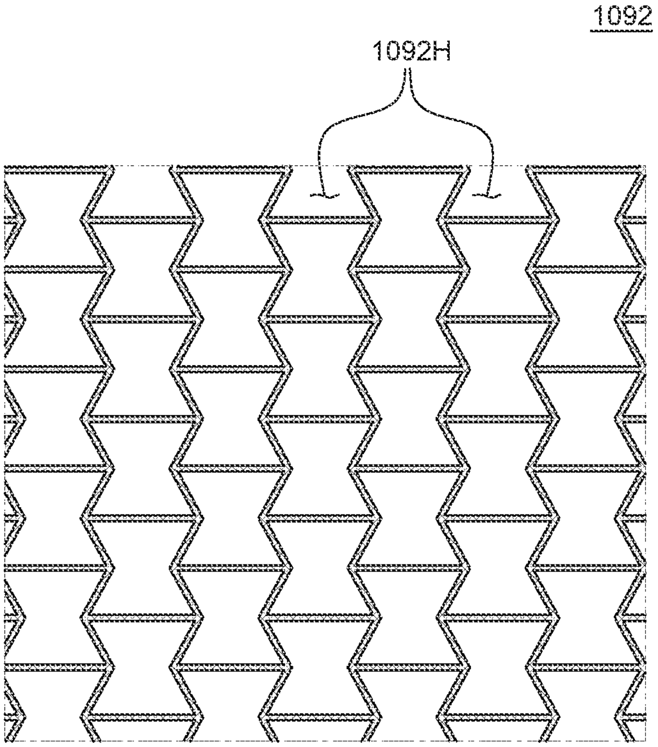
FIG. 10B is an enlarged plan view of a base layer of an adhesive unit of a display device according to still another example embodiment of the present disclosure.
Figure 10C:
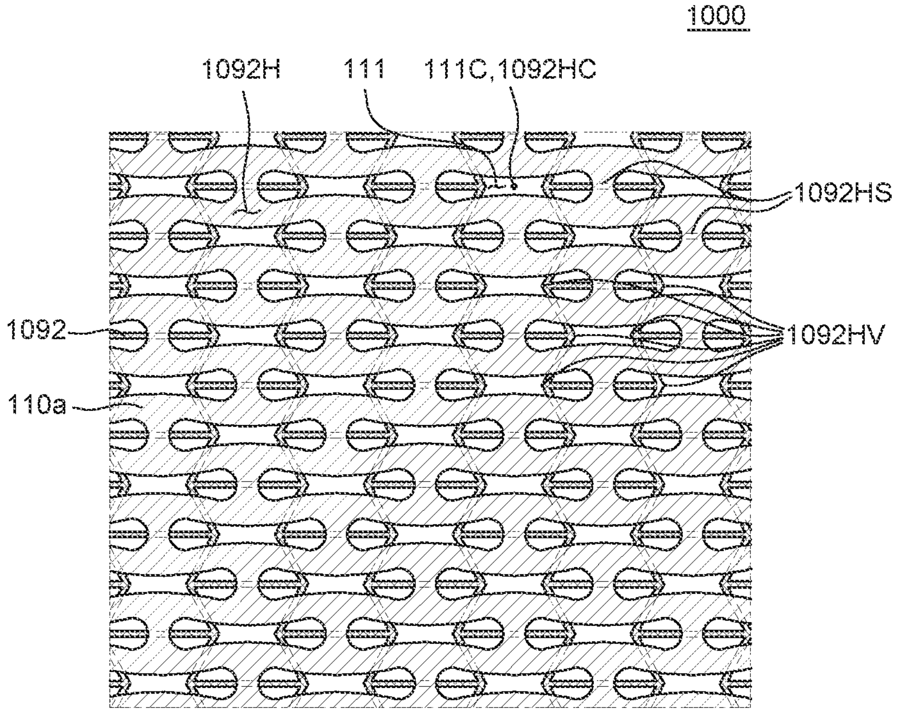
FIG. 10C is an enlarged plan view for explaining an overlapping state of a first cover and a base layer of a display device according to still another example embodiment of the present disclosure.

FIG. 10A is an enlarged plan view of a first cover of a display device according to still another example embodiment of the present disclosure. FIG. 10B is an enlarged plan view of a base layer of an adhesive unit of a display device according to still another example embodiment of the present disclosure. FIG. 10C is an enlarged plan view for explaining an overlapping state of a first cover and a base layer of a display device according to still another example embodiment of the present disclosure. The only difference between a display device 1000 of FIGS. 10A to 10C and the display device 100 of FIGS. 1A to 7C is a base layer 1092, but other configurations are substantially the same, so that a redundant description will be omitted.

Referring to FIG. 10A, a first cover 110*a* can include a plurality of openings 111. The plurality of openings 111 can have a width of each of the plurality of openings 111 in the column direction which is smaller than a width of each of the plurality of openings 111 in the row direction to allow the first cover 110*a* to be wound or unwound. Therefore, when the display panel 120 and the first cover 110*a* are wound or unwound by the roller unit 160, a stress which is applied to the display panel 120 and the first cover 110*a* can be minimized by the plurality of openings 111 to provide a reliable rollable display device 1000.

Referring to FIG. 10B, a shape of a plurality of patterns can be a shape of a hole 1092H and a shape of each of the plurality of patterns can be different from the shape of each of the plurality of openings 111. Therefore, a shape of each of the plurality of holes 1092H which is a plurality of patterns can be a hexagonal hourglass shape. That is, the base layer 1092 can be formed of a base material portion which forms an hourglass shape.

Referring to FIG. 10B, the plurality of holes 1092H are disposed to be staggered with the plurality of holes 1092H in an adjacent row. For example, a plurality of holes 1092H disposed in one row are disposed to be staggered from a plurality of holes 1092H disposed in a row adjacent to the row. Specifically, centers of the plurality of holes 1092H disposed in an odd-numbered row and centers of the plurality of holes 1092H disposed in an even-numbered row can be staggered. However, the placement of the plurality of holes 1092H illustrated in FIG. 10B is just an example, and is not limited thereto.

Referring to FIG. 10C, the plurality of holes 1092H which is a plurality of patterns of the base layer 1092 can have a hexagonal hourglass shape and all sides 1092HS of the plurality of hexagonal holes 1092H can partially overlap the plurality of openings 111. That is, all sides 1092HS of the plurality of holes 1092H are configured by a part overlapping the plurality of openings 111 and a part which does not overlap the plurality of openings 111.

Referring to FIG. 10C, the centers 1092HC of the plurality of holes 1092H which is a plurality of patterns can overlap the plurality of openings 111. Further, the centers 1092HC of the plurality of holes 1092H can match the centers 111C of the plurality of openings 111, but is not limited thereto.

Referring to FIG. 10C, vertexes 1092HV of the plurality of holes 1092H overlap the plurality of openings 111. That is, all vertexes of the plurality of hexagonal holes 1092H can overlap the plurality of openings 111.

In the display device 1000 according to still another example embodiment of the present disclosure, the base layer 1092 of the adhesive unit has a plurality of patterns to reduce the modulus of the adhesive unit. Specifically, the plurality of patterns of the base layer 1092 can be a plurality of hexagonal holes 1092H having an hourglass shape. Accordingly, in the display device 1000 according to still another example embodiment of the present disclosure, the base layer 1092 having the plurality of hexagonal holes 1092H having an hourglass shape are used to reduce the modulus of the base layer 1092 and reduce the stress at an outermost periphery of the display device 1000 by a stress decoupling effect. Therefore, a crack generated in the display device 1000 can be minimized and the reliability of the display device 1000 can be improved.

Further, in the display device 1000 according to another example embodiment of the present disclosure, the base layer 1092 of the adhesive unit has a plurality of patterns which are a plurality of hexagonal holes 1092H having an hourglass shape. Therefore, the residual adhesive leakage phenomenon of the adhesive members 191 and 193 through the opening 111 of the first cover 110*a* can also be minimized. Specifically, the plurality of holes 1092H of the base layer 1092 can have a hexagonal shape of an hourglass shape and all sides 1092HS of a hexagon of the plurality of holes 1092H of the base layer 1092 can partially overlap the plurality of openings 111. That is, the centers 1092HC of the plurality of patterns can overlap the plurality of openings 111 and the vertexes 1092HV of the plurality of patterns can overlap the plurality of openings 111. Therefore, an area of the base layer 1092 excluding the plurality of holes 1092H can overlap at least a part of the plurality of openings 111 of the first cover 110*a*. Accordingly, in the display device 1000 according to still another example embodiment of the present disclosure, overlapping of an area of the adhesive unit excluding the base layer 1092 and the plurality of openings 111 of the first cover 110*a* is minimized to reduce the modulus. Therefore, when the display device 1000 is used for a long time, the residual adhesive leakage phenomenon which is a leakage phenomenon of the adhesive members 191 and 193 through the plurality of openings 111 of the first cover 110*a* can be improved. Further, the damage of the display panel 120 due to the leaked adhesive members 191 and 193 and the phenomenon in which the leaked adhesive members 191 and 193 are visible to the user can also be minimized.

Figure 11:
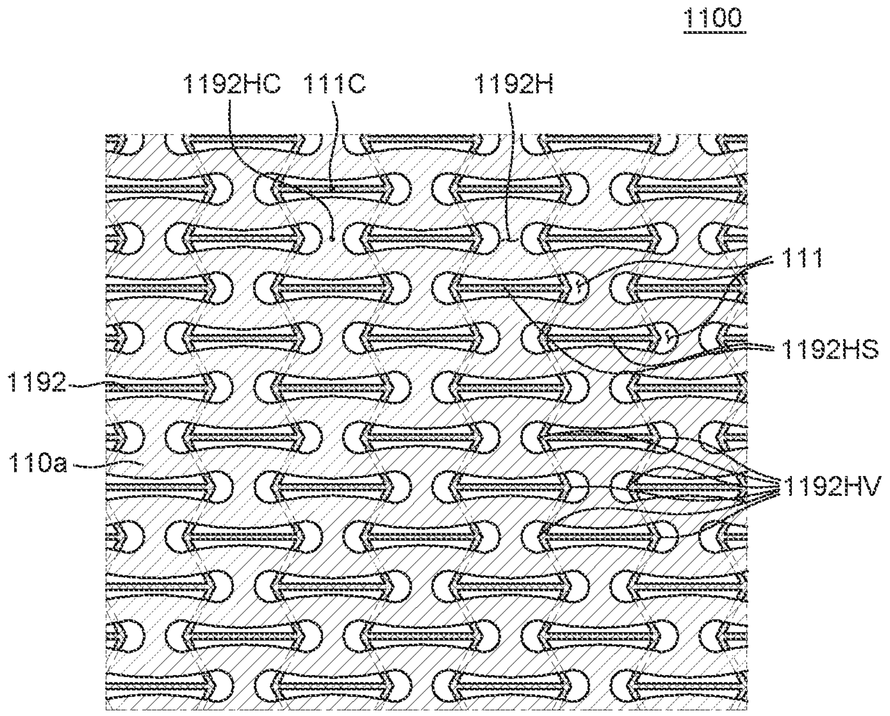
FIG. 11 is an enlarged plan view for explaining an overlapping state of a first cover and a base layer of a display device according to still another example embodiment of the present disclosure.

FIG. 11 is an enlarged plan view for explaining an overlapping state of a first cover and a base layer of a display device according to still another example embodiment of the present disclosure. The only difference between a display device 1100 of FIG. 11 and the display device 1000 of FIGS. 10A to 10C is a base layer 1192, but the other configuration is substantially the same, so that a redundant description will be omitted.

Referring to FIG. 11, a plurality of holes 1192H which is a plurality of patterns of the base layer 1192 can have a hexagonal hourglass shape. At this time, some sides 1192HS of all sides of the plurality of hexagonal holes 1192H can completely overlap the plurality of openings 111 and the other sides 1192HS can partially overlap the plurality of openings 111. For example, as illustrated in FIG. 11, two sides 1192HS extending in the same direction as the extending direction of the plurality of openings 111 can completely overlap the plurality of openings 111. Further, the remaining four sides 1192HS are configured by a part overlapping the plurality of openings 111 and a part which does not overlap the plurality of openings 111.

Referring to FIG. 11, the centers 1192HC of the plurality of holes 1192H do not overlap the plurality of openings 111. That is, the centers 1192HC of the plurality of holes 1192H do not match the centers 111C of the plurality of openings 111, but can overlap the area of the first cover 110*a* rather than the plurality of openings 111. Specifically, the centers 1192HC of the plurality of holes 1192H can overlap a space between two adjacent openings 111 of the plurality of openings 111.

Referring to FIG. 11, vertexes 1192HV of the plurality of holes 1192H can overlap the plurality of openings 111. That is, all vertexes 1192HV of the plurality of hexagonal holes 1192H can overlap the plurality of openings 111. Further, all vertexes 1192HV of the plurality of holes 1192H can be disposed to overlap a portion of the plurality of openings 111 which has a relatively larger width.

In the display device 1100 according to still another example embodiment of the present disclosure, the base layer 1192 of the adhesive unit has a plurality of patterns to reduce the modulus of the adhesive unit. Specifically, the plurality of patterns of the base layer 1192 can be a plurality of hexagonal holes 1192H having an hourglass shape. Accordingly, in the display device 1100 according to still another example embodiment of the present disclosure, the base layer 1192 having the plurality of hexagonal holes 1192H having an hourglass shape is used to reduce the modulus of the base layer 1192 and reduce the stress at an outermost periphery of the display device 1100 by a stress decoupling effect. Therefore, a crack generated in the display device 1100 can be minimized and the reliability of the display device 1100 can be improved.

Further, in the display device 1100 according to another example embodiment of the present disclosure, the base layer 1192 of the adhesive unit has a plurality of hexagonal holes 1192H having an hourglass shape. Therefore, the residual adhesive leakage phenomenon of the adhesive members 191 and 193 through the opening 111 of the first cover 110*a* can also be minimized. Specifically, the plurality of holes 1192H of the base layer 1192 can have a hexagonal hourglass shape and centers 1192HC of the plurality of holes 1192H which is a plurality of patterns can overlap a space between two adjacent openings 111 among the plurality of openings 111. At this time, some of the hexagonal sides 1192HS completely overlap the plurality of openings 111 to increase an area in which an area of the base layer 1192 excluding the plurality of holes 1192H overlaps the plurality of openings 111 of the first cover 110*a*. Accordingly, in the display device 1100 according to still another example embodiment of the present disclosure, overlapping of an area of the adhesive unit excluding the base layer 1192 and the plurality of openings 111 of the first cover 110*a* is minimized to reduce the modulus. Therefore, when the display device 1100 is used for a long time, the residual adhesive leakage phenomenon which is a leakage phenomenon of the adhesive members 191 and 193 through the plurality of openings 111 of the first cover 110*a* can be improved. Further, the damage of the display panel 120 due to the leaked adhesive members 191 and 193 and the phenomenon in which the leaked adhesive members 191 and 193 are visible to the user can be minimized.

Figure 12A:
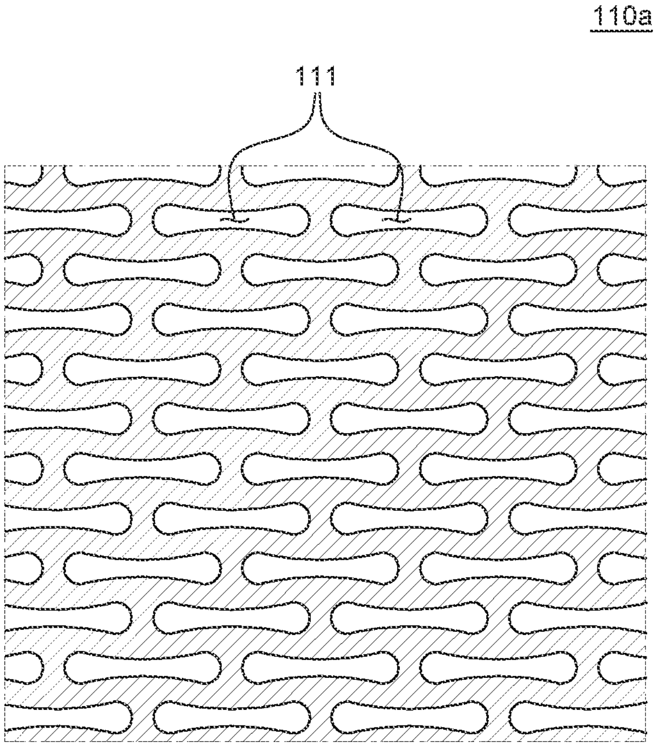
FIG. 12A is an enlarged plan view of a first cover of a display device according to still another example embodiment of the present disclosure.
Figure 12B:
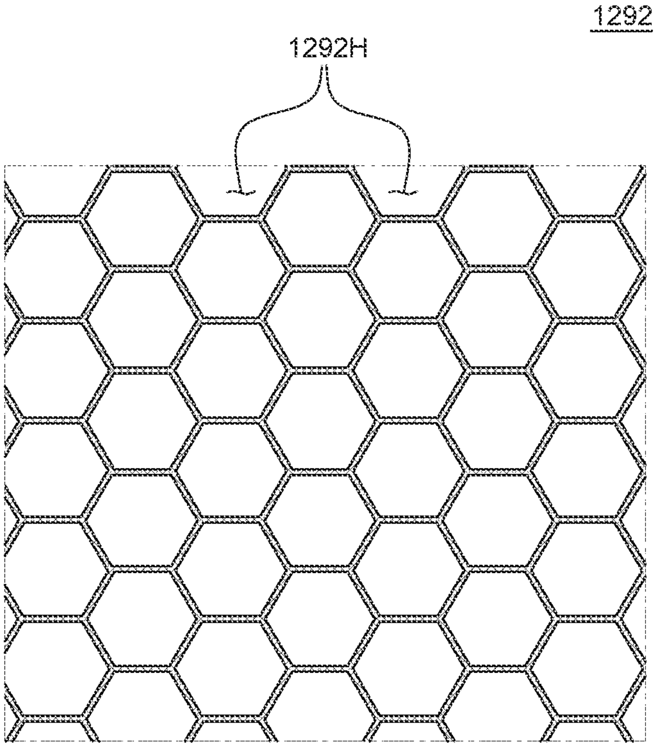
FIG. 12B is an enlarged plan view of a base layer of an adhesive unit of a display device according to still another example embodiment of the present disclosure.
Figure 12C:
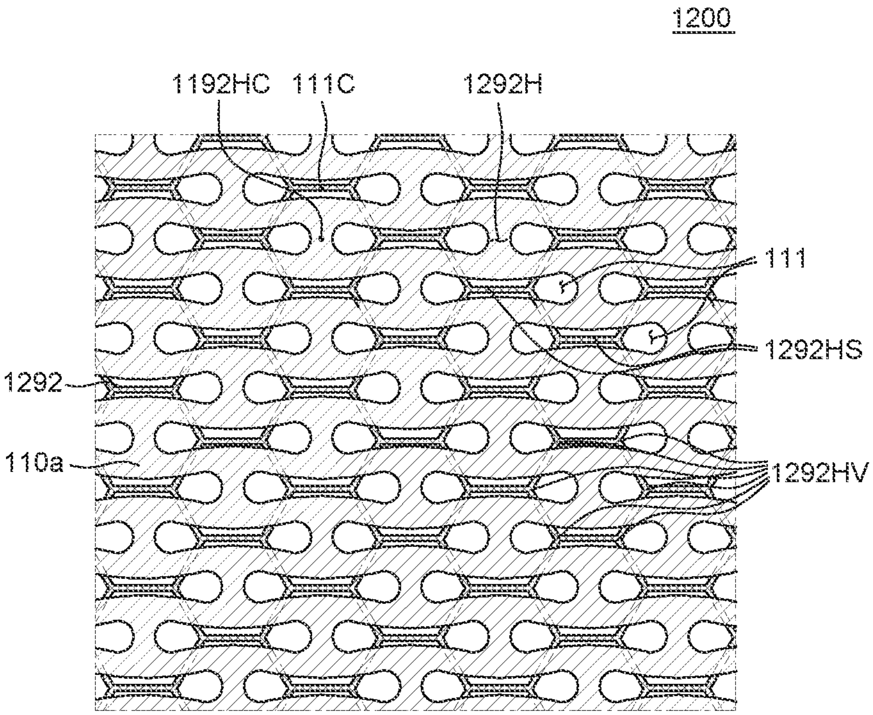
FIG. 12C is an enlarged plan view for explaining an overlapping state of a first cover and a base layer of a display device according to still another example embodiment of the present disclosure.

FIG. 12A is an enlarged plan view of a first cover of a display device according to still another example embodiment of the present disclosure. FIG. 12B is an enlarged plan view of a base layer of an adhesive unit of a display device according to still another example embodiment of the present disclosure. FIG. 12C is an enlarged plan view for explaining an overlapping state of a first cover 110*a* and a base layer of a display device according to still another example embodiment of the present disclosure. The only difference between a display device 1200 of FIGS. 12A to 12C and the display device 100 of FIGS. 1A to 7C is a base layer 1292, but other configurations are substantially the same, so that a redundant description will be omitted.

Referring to FIG. 12A, the first cover 110*a* can include a plurality of openings 111. A width of each of the plurality of openings 111 in the column direction can be smaller than a width of each of the plurality of openings 111 in the row direction to allow the first cover 110*a* to be wound or unwound. Therefore, when the display panel 120 and the first cover 110*a* are wound or unwound by the roller unit 160, a stress which is applied to the display panel 120 and the first cover 110*a* can be minimized by the plurality of openings 111 to provide a reliable rollable display device 1200.

Referring to FIG. 12B, a shape of each of a plurality of patterns can be a shape of a hole 1292H and a shape of each of the plurality of patterns can be different than the shape of each of the plurality of openings 111. At this time, a shape of each of the plurality of holes 1292H which is a plurality of patterns can be a hexagonal shape. That is, the base layer 1092 can have a honeycomb shape having a plurality of holes 1292H which is a plurality of hexagonal patterns.

Referring to FIG. 12B, the plurality of holes 1292H is disposed to be staggered from the plurality of holes 1292H in an adjacent row. For example, a plurality of holes 1292H disposed in one row are disposed to be staggered from a plurality of holes 1292H disposed in a row adjacent to the row. Specifically, centers of the plurality of holes 1292H disposed in an odd-numbered row and centers of the plurality of holes 1292H disposed in an even-numbered row can be staggered. However, the placement of the plurality of holes 1292H illustrated in FIG. 12B is just an example, and is not limited thereto.

Referring to FIG. 12C, the plurality of holes 1292H which is a plurality of patterns of the base layer 1292 can have a hexagonal shape and configure a honeycomb-shaped base layer 1292. At this time, some sides 1292HS of all sides of the plurality of hexagonal holes 1292H can completely overlap the plurality of openings 111 and the other sides 1292HS can partially overlap the plurality of openings 111. For example, as illustrated in FIG. 12C, two sides 1292HS extending in the same direction as the extending direction of the plurality of openings 111 can completely overlap the plurality of openings 111. Further, the remaining four sides 1292HS are configured by a part overlapping the plurality of openings 111 and a part which does not overlap the plurality of openings 111.

Referring to FIG. 12C, the centers 1292HC of the plurality of holes 1292H do not overlap the plurality of openings 111. That is, the centers 1292HC of the plurality of holes 1292H do not match the centers 111C of the plurality of openings 111, but can overlap the area of the first cover 110*a* rather than the plurality of openings 111. Specifically, the centers 1292HC of the plurality of holes 1292H which is a plurality of patterns can overlap a space between two adjacent openings 111 of the plurality of openings 111.

Referring to FIG. 12C, vertexes 1292HV of the plurality of holes 1292H can overlap the plurality of openings 111. That is, all vertexes of the plurality of hexagonal holes 1292H can overlap the plurality of openings 111. For example, as shown in FIG. 12C, a single hexagonal cell in base layer 1292 can have all of its vertexes overlapping with open areas of the openings 111 in the first cover 110*a*.

In the display device 1200 according to still another example embodiment of the present disclosure, the base layer 1292 of the adhesive unit has a plurality of patterns to reduce the modulus of the adhesive unit. Specifically, the plurality of patterns of the base layer 1292 can have a honeycomb shape having a plurality of hexagonal holes 1292H. Accordingly, in the display device 1200 according to still another example embodiment of the present disclosure, the base layer 1292 having the plurality of hexagonal holes 1292H having a honeycomb shape is used to reduce the modulus of the base layer 1292 and reduce the stress at an outermost periphery of the display device 1200 by a stress decoupling effect. Therefore, a crack generated in the display device 1200 can be minimized and the reliability of the display device 1200 can be improved.

Further, in the display device 1200 according to another example embodiment of the present disclosure, the base layer 1292 of the adhesive unit has a plurality of hexagonal honeycomb-shaped patterns so that the residual adhesive leakage phenomenon of the adhesive members 191 and 193 through the opening 111 of the first cover 110*a* can also be minimized. Specifically, the plurality of holes 1292H of the base layer 1292 can have a hexagonal honeycomb shape and centers 1292HC of the plurality of holes 1292H which is a plurality of patterns can overlap a space between two adjacent openings 111 among the plurality of openings 111. At this time, vertexes 1292HV of the plurality of holes 1292H can overlap the plurality of openings 111 and some sides 1292HS of the sides 1292HS of the hexagon can completely overlap the plurality of openings 111. Therefore, an area of the base layer 1292 excluding the plurality of holes 1292H can overlap at least a part of the plurality of openings 111 of the first cover 110*a*. Accordingly, in the display device 1200 according to still another example embodiment of the present disclosure, overlapping of an area of the adhesive unit excluding the base layer 1292 and the plurality of openings 111 of the first cover 110*a* is minimized to reduce the modulus. Therefore, when the display device 1200 is used for a long time, the residual adhesive leakage phenomenon which is a leakage phenomenon of the adhesive members 191 and 193 through the plurality of openings 111 of the first cover 110*a* can be improved. Further, the damage of the display panel 120 due to the leaked adhesive members 191 and 193 and the phenomenon in which the leaked adhesive members 191 and 193 are visible to the user can also be minimized.

Figure 13:
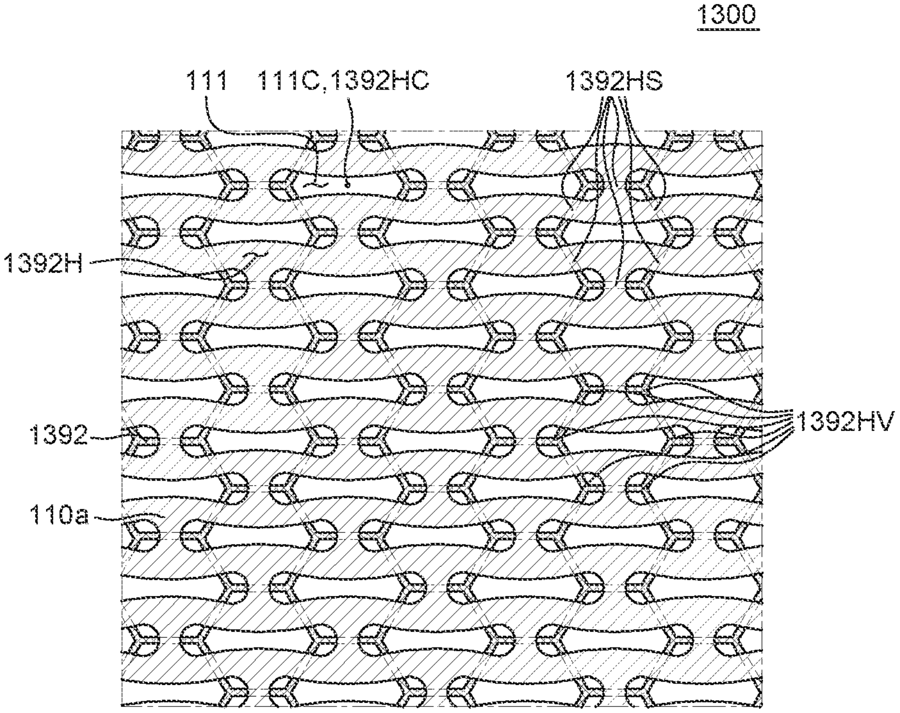
FIG. 13 is an enlarged plan view for explaining an overlapping state of a first cover and a base layer of a display device according to still another example embodiment of the present disclosure.

FIG. 13 is an enlarged plan view for explaining an overlapping state of a first cover and a base layer of a display device according to still another example embodiment of the present disclosure. The only difference between a display device 1300 of FIG. 13 and the display device 1200 of FIGS. 12A to 12C is a base layer 1392, but the other configuration is substantially the same, so that a redundant description will be omitted.

Referring to FIG. 13, the plurality of holes 1392H which is a plurality of patterns of the base layer 1392 can have a hexagonal hourglass shape and all sides 1392HS of the plurality of hexagonal holes 1392H can partially overlap the plurality of openings 111. That is, all sides 1392HS of the plurality of holes 1392H are configured by a part overlapping the plurality of openings 111 and a part which does not overlap the plurality of openings 111.

Referring to FIG. 13, the centers 1392HC of the plurality of holes 1392H can overlap the plurality of openings 111. Further, the centers 1392HC of the plurality of holes 1392H can match the centers 111C of the plurality of openings 111, but is not limited thereto (e.g., a center 1392C of one of the hexagonal holes 1392H in the base layer 1392 can overlap with a center 111C of one of the openings 111 in the first cover 110*a*).

Referring to FIG. 13, vertexes 1392HV of the plurality of holes 1392H can overlap the plurality of openings 111. That is, all vertexes of the plurality of hexagonal holes 1392H can overlap the plurality of openings 111. Further, all vertexes 1392HV of the plurality of holes 1392H can be disposed to overlap a portion of the plurality of openings 111 which has a relatively larger width.

In the display device 1300 according to still another example embodiment of the present disclosure, the base layer 1392 of the adhesive unit has a plurality of patterns to reduce the modulus of the adhesive unit. Specifically, the plurality of patterns of the base layer 1392 can have a honeycomb shape having a plurality of hexagonal holes 1392H. Accordingly, in the display device 1300 according to still another example embodiment of the present disclosure, the base layer 1392 having the plurality of holes 1392H having a hexagonal honeycomb shape is used to reduce the modulus of the base layer 1392 and reduce the stress at an outermost periphery of the display device 1300 by a stress decoupling effect. Therefore, a crack generated in the display device 1300 can be minimized and the reliability of the display device 1300 can be improved.

Further, in the display device 1300 according to another example embodiment of the present disclosure, the base layer 1392 of the adhesive unit has a plurality of hexagonal honeycomb-shaped patterns so that the residual adhesive leakage phenomenon of the adhesive members 191 and 193 through the opening 111 of the first cover 110*a* can also be minimized. Specifically, the plurality of holes 1392H of the base layer 1392 can have a hexagonal honeycomb shape and centers 1392HC of the plurality of holes 1392H which is a plurality of patterns can overlap the plurality of openings 111. At this time, vertexes 1392HV of the plurality of holes 1392H which is a plurality of patterns can overlap the plurality of openings 111 and all sides 1392HS of the hexagon can partially overlap the plurality of openings 111. Therefore, an area of the base layer 1392 excluding the plurality of holes 1392H can overlap at least a part of the plurality of openings 111 of the first cover 110*a*. Accordingly, in the display device 1300 according to still another example embodiment of the present disclosure, overlapping of an area of the adhesive unit excluding the base layer 1392 and the plurality of openings 111 of the first cover 110*a* is minimized to reduce the modulus. Therefore, when the display device 1300 is used for a long time, the residual adhesive leakage phenomenon which is a leakage phenomenon of the adhesive members 191 and 193 through the plurality of openings 111 of the first cover 110*a* can be improved. Further, the damage to the display panel 120 due to the leaked adhesive members 191 and 193 and the phenomenon in which the leaked adhesive members 191 and 193 are visible to the user can also be minimized.

Figure 14A:
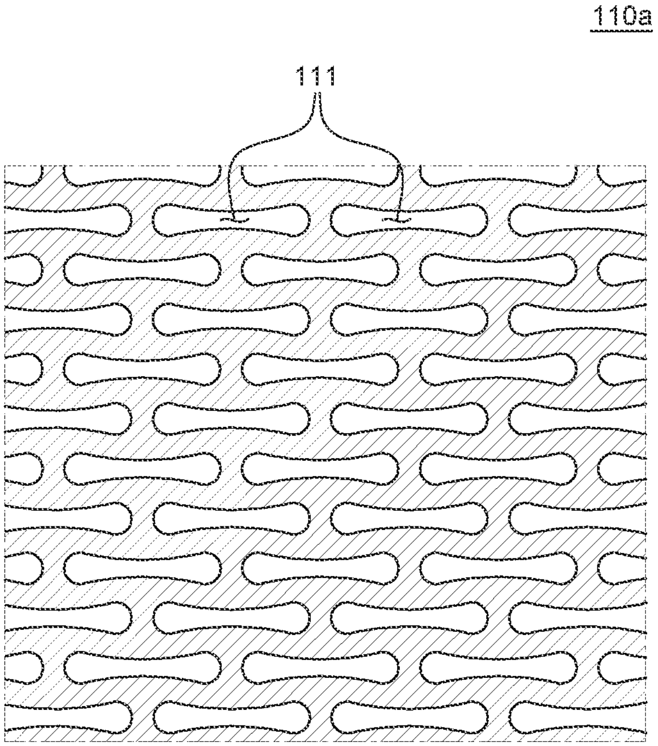
FIG. 14A is an enlarged plan view of a first cover of a display device according to still another example embodiment of the present disclosure.
Figure 14B:
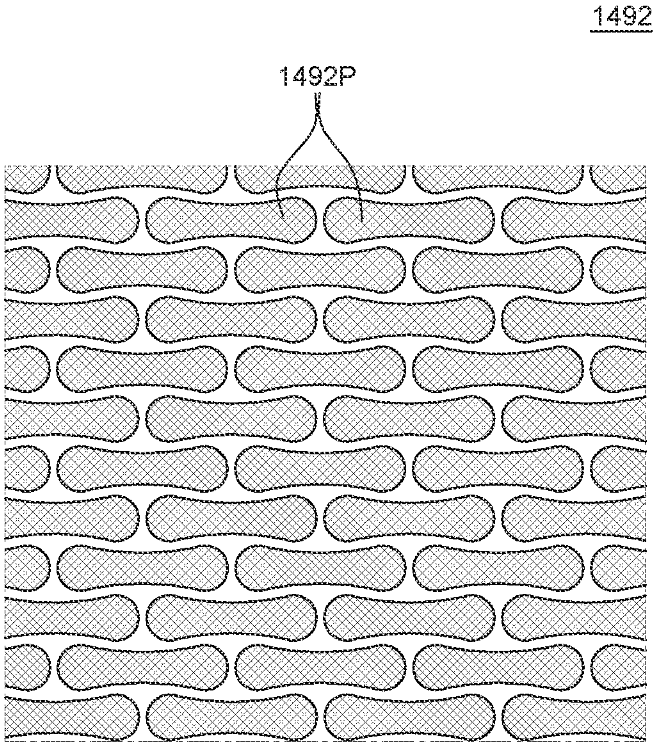
FIG. 14B is an enlarged plan view of a base layer of an adhesive unit of a display device according to still another example embodiment of the present disclosure.
Figure 14C:
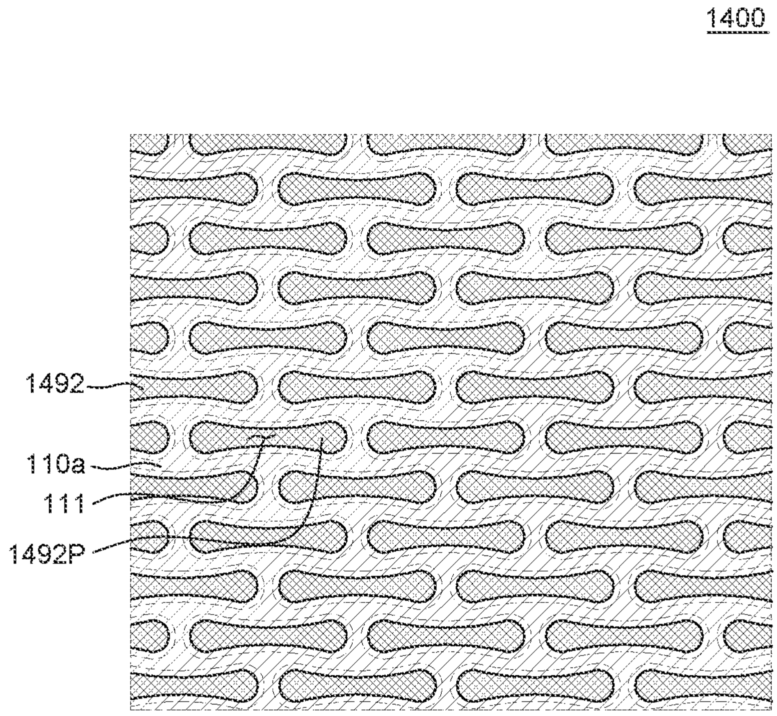
FIG. 14C is an enlarged plan view for explaining an overlapping state of a first cover and a base layer of a display device according to still another example embodiment of the present disclosure.

FIG. 14A is an enlarged plan view of a first cover of a display device according to still another example embodiment of the present disclosure. FIG. 14B is an enlarged plan view of a base layer of an adhesive unit of a display device according to still another example embodiment of the present disclosure. FIG. 14C is an enlarged plan view for explaining an overlapping state of a first cover 110*a* and a base layer of a display device according to still another example embodiment of the present disclosure. The only difference between a display device 1400 of FIGS. 14A to 14C and the display device 100 of FIGS. 1A to 7C is a base layer 1492, but other configurations are substantially the same, so that a redundant description will be omitted.

Referring to FIG. 14A, the first cover 110*a* can include a plurality of openings 111. A width of the plurality of openings 111 in the column direction can be smaller than a width of the plurality of openings 111 in the row direction to allow the first cover 110*a* to be wound or unwound. Therefore, when the display panel 120 and the first cover 110*a* are wound or unwound by the roller unit 160, a stress which is applied to the display panel 120 and the first cover 110*a* can be minimized by the plurality of openings 111 to provide a reliable rollable display device 1400.

Referring to FIG. 14B, the plurality of patterns of the base layer 1492 can be base patterns 1492P. That is, the base layer 1492 can be formed by a plurality of base patterns 1492P which are spaced apart from each other.

Referring to FIG. 14B, the plurality of base patterns 1492P can have the same shape as the plurality of openings 111. Widths of the plurality of base patterns 1492P in the column direction can be smaller than widths of the plurality of base patterns 1492P in the row direction.

Referring to FIG. 14C, sizes of the plurality of base patterns 1492P can be larger than sizes of the plurality of openings 111. That is, a size of each of the plurality of base patterns 1492P can be larger than a size of each of the plurality of openings 111. Here, when the size of the base patterns 1492P is larger than a size of the opening 111, it means that an area occupied by one base pattern 1492P is larger than an area occupied by one opening 111 on the plane.

Referring to FIG. 14C, the plurality of base patterns 1492P of the base layer 1492 can overlap the plurality of openings 111. For example, the plurality of base patterns 1492P have a larger size than that of the plurality of openings 111 and centers of the base patterns 1492P and centers of the openings 111 can match and overlap each other. Therefore, the plurality of base patterns 1492P can cover all areas of the plurality of openings 111.

In the display device 1400 according to still another example embodiment of the present disclosure, the base layer 1492 of the adhesive unit has a plurality of base patterns 1492P to reduce the modulus of the adhesive unit. Specifically, the plurality of base patterns 1492P of the base layer 1492 has the same shape as the plurality of openings 111 and has a larger size than that of the plurality of openings 111. Therefore, the display device 1400 according to still another example embodiment of the present disclosure uses the base layer 1492 which is the plurality of base patterns 1492P having the same shape as the plurality of openings 111 and a larger size than that of the plurality of openings 111. By doing this, the modulus of the base layer 1492 can be reduced and the stress at the outermost periphery of the display device 1400 can be reduced by the stress decoupling effect. Therefore, a crack generated in the display device 1400 can be minimized and the reliability of the display device 1400 can be improved.

Further, in the display device 1400 according to another example embodiment of the present disclosure, the base layer 1492 of the adhesive unit has a plurality of base patterns 1492P having the same shape as the plurality of openings 111 and a larger size than that of the plurality of openings 111. By doing this, the residual adhesive leakage phenomenon of the adhesive members 191 and 193 by means of the opening 111 of the first cover 110*a* can also be minimized. Specifically, the plurality of base patterns 1492P of the base layer 1492 has the same shape as the plurality of openings 111 and has a larger size than that of the plurality of openings 111 and all the plurality of openings 111 of the first cover 110*a* can overlap the plurality of base patterns 1492P of the base layer 1492. Accordingly, in the display device 1400 according to still another example embodiment of the present disclosure, the plurality of base patterns 1492P can cover all the plurality of openings 111. Therefore, the residual adhesive leakage phenomenon which is a leakage phenomenon of the adhesive members 191 and 193 through the plurality of openings 111 of the first cover 110*a* caused when the display device 1400 is used for a long time can be improved. Further, the damage of the display panel 120 due to the leaked adhesive members 191 and 193 and the phenomenon in which the leaked adhesive members 191 and 193 are visible to the user can also be minimized.

Further, in the display device 1400 according to still another example embodiment of the present disclosure, the size of the plurality of base patterns 1492P is formed to be larger than the size of the plurality of openings 111 so that an alignment process of the base layer 1492 and the first cover 110*a* can be more easily performed. That is, since the size of the plurality of base patterns 1492P is larger than the size of the plurality of openings 111, even if the plurality of base patterns 1492P become partially misaligned from the plurality of openings 111 during the manufacturing process of the display device 1400, the plurality of base patterns 1492P of the base layer 1492 can still be disposed to completely cover the plurality of openings 111.

Figure 15A:
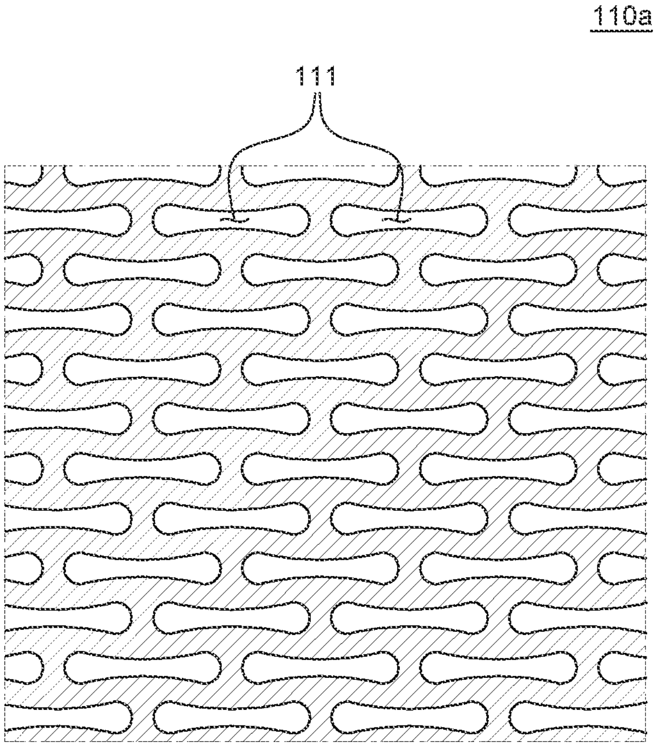
FIG. 15A is an enlarged plan view of a first cover of a display device according to still another example embodiment of the present disclosure.
Figure 15B:
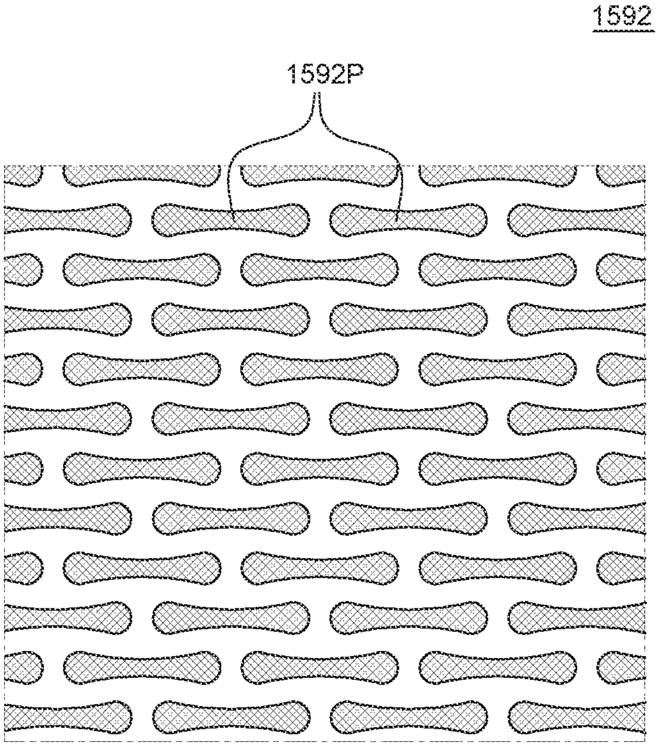
FIG. 15B is an enlarged plan view of a base layer of an adhesive unit of a display device according to still another example embodiment of the present disclosure.
Figure 15C:
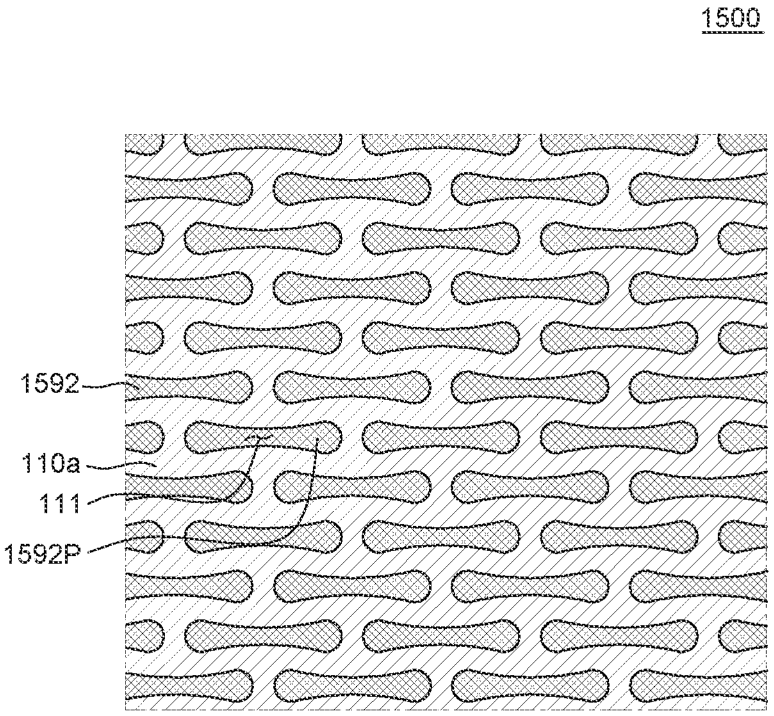
FIG. 15C is an enlarged plan view for explaining an overlapping state of a first cover and a base layer of a display device according to still another example embodiment of the present disclosure.

FIG. 15A is an enlarged plan view of a first cover of a display device according to still another example embodiment of the present disclosure. FIG. 15B is an enlarged plan view of a base layer of an adhesive unit of a display device according to still another example embodiment of the present disclosure. FIG. 15C is an enlarged plan view for explaining an overlapping state of a first cover 110*a* and a base layer of a display device according to still another example embodiment of the present disclosure. The only difference between a display device 1500 of FIGS. 15A to 15C and the display device 1400 of FIGS. 14A to 14C is a base layer 1592, but other configurations are substantially the same, so that a redundant description will be omitted.

Referring to FIG. 15A, the first cover 110*a* can include a plurality of openings 111. A width of the plurality of openings 111 in the column direction can be smaller than a width of the plurality of openings 111 in the row direction to allow the first cover 110*a* to be wound or unwound. Therefore, when the display panel 120 and the first cover 110*a* are wound or unwound by the roller unit 160, a stress which is applied to the display panel 120 and the first cover 110*a* may be minimized by the plurality of openings 111 to provide a reliable rollable display device 1500.

Referring to FIG. 15B, the plurality of patterns of the base layer 1592 can be base patterns 1592P. That is, the base layer 1592 can be formed by a plurality of base patterns 1592P which are spaced apart from each other.

Referring to FIG. 15B, the plurality of base patterns 1592P can have the same shape as the plurality of openings 111. Widths of the plurality of base patterns 1592P in the column direction can be smaller than widths of the plurality of base patterns 1592P in the row direction.

Referring to FIG. 15C, sizes of the plurality of base patterns 1592P can be equal to sizes of the plurality of openings 111. That is, a size of each of the plurality of base patterns 1592P can be equal to a size of each of the plurality of openings 111. Here, when the size of the base pattern 1592P is equal to a size of the opening 111, it means that an area occupied by one base pattern 1592P is equal to an area occupied by one opening 111 on the plane.

Referring to FIG. 15C, the plurality of base patterns 1592P of the base layer 1592 can overlap the plurality of openings 111. For example, each of the plurality of base patterns 1592P has a size equal to each of the plurality of openings 111, and centers of the base patterns 1592P and centers of the openings 111 can match and overlap each other. Therefore, the plurality of base patterns 1592P can cover all areas of the plurality of openings 111.

In the display device 1500 according to still another example embodiment of the present disclosure, the base layer 1592 of the adhesive unit has a plurality of base patterns 1592P to reduce the modulus of the adhesive unit. Specifically, the plurality of base patterns 1592P of the base layer 1592 has the same shape and the same size as the plurality of openings 111. Therefore, the display device 1500 according to still another example embodiment of the present disclosure uses the base layer 1592 which is the plurality of base patterns 1592P having the same shape and the same size as the plurality of openings 111. By doing this, the modulus of the base layer 1592 can be reduced and the stress at the outermost periphery of the display device 1500 can be reduced by the stress decoupling effect. Therefore, a crack generated in the display device 1500 can be minimized and the reliability of the display device 1500 can be improved.

Further, in the display device 1500 according to another example embodiment of the present disclosure, the base layer 1592 of the adhesive unit has a plurality of base patterns 1592P having the same shape and the same size as the plurality of openings 111. By doing this, the residual adhesive leakage phenomenon of the adhesive members 191 and 193 by means of the opening 111 of the first cover 110*a* can also be minimized. Specifically, the base layer 1592 can have a plurality of patterns and the plurality of patterns can be a plurality of base patterns 1592P having the same shape and the same size as the plurality of openings 111. Therefore, all the plurality of openings 111 of the first cover 110*a* can match the plurality of base patterns 1592P of the base layer 1592. Accordingly, in the display device 1500 according to still another example embodiment of the present disclosure, the plurality of base patterns 1592P can cover all the plurality of openings 111. Therefore, the residual adhesive leakage phenomenon which is a leakage phenomenon of the adhesive members 191 and 193 through the plurality of openings 111 of the first cover 110*a* caused when the display device 1500 is used for a long time can be improved. Further, the damage of the display panel 120 due to the leaked adhesive members 191 and 193 and the phenomenon in which the leaked adhesive members 191 and 193 are visible to the user can also be minimized.

The example embodiments of the present disclosure can also be described as follows:

According to an aspect of the present disclosure, a display device, comprising a display panel; a cover which supports a rear surface of the display panel and includes a plurality of openings; a roller configured to wind or unwind the display panel and the cover; and an adhesive unit which bonds the display panel and the cover, the adhesive unit includes a first adhesive member; a base layer which is disposed on the first adhesive member and has a plurality of patterns; and a second adhesive member on the first adhesive member and the base layer.

The plurality of patterns can have a hole shape. A shape and a size of the plurality of patterns can be the same as a shape and a size of the plurality of openings and the plurality of patterns and the plurality of openings can be alternately disposed.

A shape of each of the plurality of patterns can be the same as a shape of each of the plurality of openings and a size of the plurality of patterns can be different than a size of the plurality of openings.

A shape of each of the plurality of patterns can be different than a shape of each of the plurality of openings.

The base layer can have a honeycomb shape having the plurality of patterns which have a hexagonal shape and centers of the plurality of patterns overlap the plurality of openings.

The base layer can have a honeycomb shape having the plurality of patterns which have a hexagonal shape and centers of the plurality of patterns overlap a space between two adjacent openings among the plurality of openings.

The plurality of patterns can have a hexagonal hourglass shape and centers of the plurality of patterns overlap the plurality of openings.

The plurality of patterns can have a hexagonal hourglass shape and centers of the plurality of patterns overlap a space between two adjacent openings among the plurality of openings.

The plurality of patterns can be a plurality of base patterns which has the same shape as the plurality of openings and overlaps the plurality of openings.

A size of each of the plurality of base patterns can be equal to or larger than a size of each of the plurality of openings.

According to another aspect of the present disclosure, a display device, comprising a display panel; a cover which is attached onto a rear surface of the display panel and includes a plurality of openings; a roller configured to be connected to the cover to wind or unwind the display panel; and an adhesive unit which attaches the display panel to the cover, the adhesive unit includes a base layer; a first adhesive member disposed between the base layer and the display panel; and a second adhesive member disposed between the base layer and the cover.

The plurality of patterns can have a hole shape. A shape and a size of the plurality of patterns can be the same as a shape and a size of the plurality of openings and the plurality of patterns and the plurality of openings can be alternately disposed.

A shape of each of the plurality of patterns can be the same as a shape of each of the plurality of openings, and a size of the plurality of patterns can be different than a size of the plurality of openings.

A shape of each of the plurality of patterns can be different than a shape of each of the plurality of openings, and the plurality of openings can be disposed to be staggered from the plurality of openings in adjacent rows.

A vertex of the plurality of patterns overlap the plurality of openings.

The plurality of patterns can have a hexagonal shape and some sides of sides of the hexagon completely overlap the plurality of openings.

The plurality of patterns can have a hexagonal shape and all sides of the hexagon partially overlap the plurality of openings.

The base layer can be formed of a portion of a base material which forms a honeycomb shape or an hourglass shape.

Although the example embodiments of the present disclosure have been described in detail with reference to the accompanying drawings, the present disclosure is not limited thereto and can be embodied in many different forms without departing from the technical concept of the present disclosure. Therefore, the example embodiments of the present disclosure are provided for illustrative purposes only but not intended to limit the technical concept of the present disclosure. The scope of the technical concept of the present disclosure is not limited thereto. Therefore, it should be understood that the above-described example embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A rollable display device, comprising: a display panel; a cover supporting a rear surface of the display panel and including a plurality of support areas and a malleable area;

a roller configured to wind and unwind the display panel and the cover; and an adhesive unit bonding the display panel with the cover, wherein the adhesive unit includes:

a first adhesive member;

a base layer disposed on the first adhesive member and having a plurality of through hole patterns; and a second adhesive member disposed on the base layer, and wherein the malleable area is an area where the display panel is attached and a plurality of through hole openings are included in the malleable area of the cover, and wherein a shape of each of the plurality of through hole patterns in the base layer is different from a shape of each of the plurality of through hole openings in the cover.

2. The rollable display device according to claim 1, wherein the base layer has a honeycomb shape and each of the plurality of through hole patterns has a hexagonal shape, and wherein centers of the plurality of through hole patterns in the base layer overlap with the plurality of through hole openings in the cover.

3. The rollable display device according to claim 1, wherein the base layer has a honeycomb shape and each of the plurality of through hole patterns has a hexagonal shape, and wherein centers of the plurality of through hole patterns in the base layer overlap a space between two adjacent through hole openings among the plurality of through hole openings in the cover.

4. The rollable display device according to claim 1, wherein each of the plurality of through hole patterns in the base layer has a hexagonal hourglass shape, and wherein centers of the plurality of through hole patterns in the base layer overlap with the plurality of through hole openings in the cover.

5. The rollable display device according to claim 1, wherein each of the plurality of through hole patterns in the base layer has a hexagonal hourglass shape, and wherein centers of the plurality of through hole patterns in the base layer overlap a space between two adjacent through hole openings among the plurality of through hole openings in the cover.

* * * * *